United States Patent
Lim et al.

(10) Patent No.: US 10,565,100 B2
(45) Date of Patent: Feb. 18, 2020

(54) HARDWARE-BASED MEMORY MANAGEMENT APPARATUS AND MEMORY MANAGEMENT METHOD THEREOF

(71) Applicant: Samsung Electronics Co., Ltd., Suwon-si, Gyeonggi-do (KR)

(72) Inventors: Seyoun Lim, Seoul (KR); Kwonsik Kim, Suwon-si (KR); Kibeom Kim, Seoul (KR); Hyojeong Lee, Suwon-si (KR); Myungsun Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 417 days.

(21) Appl. No.: 14/681,469

(22) Filed: Apr. 8, 2015

(65) Prior Publication Data
US 2015/0286564 A1  Oct. 8, 2015

(30) Foreign Application Priority Data
Apr. 8, 2014 (KR) .................. 10-2014-0041673

(51) Int. Cl.
*G06F 12/02* (2006.01)
*G06F 12/123* (2016.01)

(52) U.S. Cl.
CPC .... *G06F 12/023* (2013.01); *G06F 2212/1044* (2013.01)

(58) Field of Classification Search
None
See application file for complete search history.

(56) References Cited

U.S. PATENT DOCUMENTS

| | | | | |
|---|---|---|---|---|
| 6,446,182 B1* | 9/2002 | Bouraoui | ............ | G06F 9/5016 409/104 |
| 7,721,052 B2* | 5/2010 | Ogasawara | ........... | G06F 1/3203 711/152 |
| 2006/0195753 A1 | 8/2006 | Nam et al. | | |
| 2007/0260608 A1 | 11/2007 | Hertzberg et al. | | |
| 2009/0089495 A1 | 4/2009 | Marinescu | | |
| 2009/0172337 A1 | 7/2009 | Van Riel et al. | | |
| 2013/0254512 A1* | 9/2013 | Takeda | ................ | G06F 12/1009 711/171 |
| 2013/0332942 A1 | 12/2013 | Ramesh et al. | | |

(Continued)

FOREIGN PATENT DOCUMENTS

EP  2 024 837 B1  12/2013

OTHER PUBLICATIONS

Michal Nazarewicz, A Deep Dive Into CMA, Mar. 14, 2012, LWN.net, pp. 1-5. (Year: 2012).*

(Continued)

*Primary Examiner* — Reginald G Bragdon
*Assistant Examiner* — Kimbleann C Verdi
(74) *Attorney, Agent, or Firm* — Jefferson IP Law, LLP

(57) ABSTRACT

A hardware-based memory management apparatus and method is provided. The apparatus includes a memory allocation module, a memory reclamation module, and a memory compaction module, based on hardware to accelerate a memory manger of an operating system. The method manages memory using the memory allocation module, memory reclamation module, and memory compaction module.

6 Claims, 33 Drawing Sheets

(56) References Cited

U.S. PATENT DOCUMENTS

2014/0095827 A1    4/2014  Wei et al.

OTHER PUBLICATIONS

McIlroy et al., "Efficient Dynamic Heap Allocation of Scratch-Pad Memory", Jun. 2008, ACM, ISMM'08, pp. 31-40. (Year: 2008).*
P. Daniel Bovet et al.: "Understanding the Linux Kernel, Second Edition Chapter 7.1. Page Frame Management" In: "Understanding the Linux Kernel, Second Edition Chapter 7.1. Page Frame Management", Dec. 17, 2002, Media, Inc., XP055205735 ISBN: 978-0-59-600213-8.

\* cited by examiner

FIG. 6A

| Offset | Register name | Contents(bit) | Type | Direction |
|---|---|---|---|---|
| 0x0000 | HW_INIT_ZONE_REQ | Start_pfn(32)<br>End_pfn(32)<br>Zone_id(32) | W | SW→HW |
| 0x000C | HW_INIT_ZONE_DONE | Result(32) | R | HW→SW |
| 0x0010 | HW_ALLOC_PAGE_REQ | Order(8)<br>Zone_id(8)<br>Migrate_type(8) | W | SW→HW |
| 0x0014 | HW_ALLOC_PAGE_DONE | allocated_pfn(32)<br>Result(8) | R | HW→SW |
| 0x001C | HW_FREE_PAGE_REQ | zone_id(8)<br>freed_Pfn(32) | W | SW→HW |
| 0x0024 | HW_FREE_PAGE_DONE | Result(32) | R | HW→SW |
| 0x0028 | HW_ADD_LRU_REQ | Zone_id(8)<br>Lru_indicator(8)<br>Pfn(32) | W | SW→HW |
| 0x0030 | HW_ADD_LRU_DONE | Result(32) | R | HW→SW |
| 0x0034 | HW_DEL_LRU_REQ | Zone_id(8)<br>Lru_indicator(8)<br>Pfn(32) | W | SW→HW |
| 0x003C | HW_DEL_LRU_DONE | Result(32) | R | HW→SW |
| 0x0040 | HW_ISOLATE_PAGE_REQ | zone_id(8)<br>Lru_indicator(8) | W | SW→HW |

FIG. 6B

| 0x0044 | HW_ISOLATE_PAGE_DONE | Start_pfn(32) bitmapPG(32) | R | HW→SW |
|---|---|---|---|---|
| 0x004C | HW_MIGRATE_PAGEBLOCK_REQ | Zone_id(8) | W | SW→HW |
| 0x0050 | HW_MIGRATE_PAGEBLOCK_DONE | Migrate_pfn(32) | R | HW→SW |
| 0x0054 | HW_COMPACTION_START | Zone_id(8) Compaction_id(24) | W | SW→HW |
| 0x0058 | HW_COMPACTION_START | Zone_id(8) Compaction_id(24) | W | SW→HW |
| 0x005C | HW_FREE_PAGEBLOCK_DONE | Freepage_pfn(32) Compaction_id(24) | R | HW→SW |
| 0x0060 | HW_COMPACTION_FINISH | Compaction_id(24) | W | SW→HW |
| 315~400 | Reserved | | | |

HARDWARE-BASED MEMORY MANAGEMENT APPARATUS AND MEMORY MANAGEMENT METHOD THEREOF

CROSS-REFERENCE TO RELATED APPLICATION(S)

This application claims the benefit under 35 U.S.C. § 119(a) of a Korean patent application filed on Apr. 8, 2014 in the Korean Intellectual Property Office and assigned Serial number 10-2014-0041673, the entire disclosure of which is hereby incorporated by reference.

TECHNICAL FIELD

The present disclosure relates to an apparatus and method of managing memory in an electronic device. More particularly, the present disclosure relates to a hardware-based memory management apparatus and a memory management method thereof.

BACKGROUND

With the development of technology, various types of electronic devices have been equipped with a variety of functions. For example, mobile devices include various types of multimedia functions as well as communication functions such as a voice call, and message transmission and reception. Examples of the multimedia functions are a TeleVision (TV) viewing function (e.g., mobile broadcasting, such as Digital Multimedia Broadcasting (DMB), Digital Video Broadcasting (DVB), etc.), a music playback function (e.g., Moving Picture Experts Group (MPEG) Audio Layer 3 (MP3)), a photographing function, Internet access function, dictionary search function, etc. According to this trend, the request of allocating memory for executing various types of multimedia functions increases. If memory is not effectively managed, e.g., memory is not allocated, a program to be executed cannot be executed.

Therefore, a method to efficiently manage memory is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a hardware-based memory management apparatus and memory management method.

In accordance with an aspect of the present disclosure, a hardware memory manager accelerator as a new object for managing memory is provided. The hardware memory manager apparatus for accelerating a function of a memory manager of an Operating System (OS) that is running as software, and a method of managing memory by using the apparatus.

In accordance with and aspect of the present disclosure, a method and apparatus that efficiently manages memory in an electronic device is provided. In addition, according to an embodiment of the present disclosure, a hardware-based memory management apparatus and memory management method may be provided.

In accordance with another aspect of the present disclosure, a method for allocating memory by a memory management device based on hardware is provided. The method includes generating zone information and page information based on initialization information received from an OS, receiving a memory allocation request message including allocation request memory size information and zone indicating information from the OS, extracting allocation indicator bit sequence information related to a page of a zone indicated by the zone indicting information based on the zone information and page information and allocating memory corresponding to the memory allocation request message based on the allocation indicator bit sequence information.

In accordance with another aspect of the present disclosure, a memory management device for allocating memory based on hardware is provided. The memory allocation device comprises an interface module connecting the memory allocation device and a OS and a memory allocation module configured to generate zone information and page information based on initialization information received from an OS, receive a memory allocation request message including allocation request memory size information and zone indicating information from the OS, extract allocation indicator bit sequence information related to a page of a zone indicated by the zone indicting information based on the zone information and page information, and allocate memory corresponding to the memory allocation request message based on the allocation indicator bit sequence information.

In accordance with another aspect of the present disclosure, a method for selecting target pages for reclaiming by a memory management device is provided. The method comprises receiving a reclamation target page request message from an OS, generating search information based on a reclamation target zone and Least Recently Used (LRU) information, selecting a reclamation target page group including largest consecutive pages from the search information and transmitting a reclamation target page selection complete message including reclamation target page group information to the OS.

In accordance with another aspect of the present disclosure, a memory management device is provided. The device includes selecting target pages for reclaiming, the memory management device comprises an interface module connecting the memory allocation device and a OS and a memory allocation module configured to receive a reclamation target page request message from an OS, generate search information based on a reclamation target zone and LRU information, select a reclamation target page group including largest consecutive pages from the search information, and transmit a reclamation target page selection complete message including reclamation target page group information to the OS.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A and 6B are diagrams that describe signal exchange information between a memory manager accelerator interface module and a software operation system according to an embodiment of the present disclosure;

Throughout the drawings, it should be noted that like reference numbers are used to depict the same or similar elements, features, and structures.

DETAILED DESCRIPTION

Figure 1:
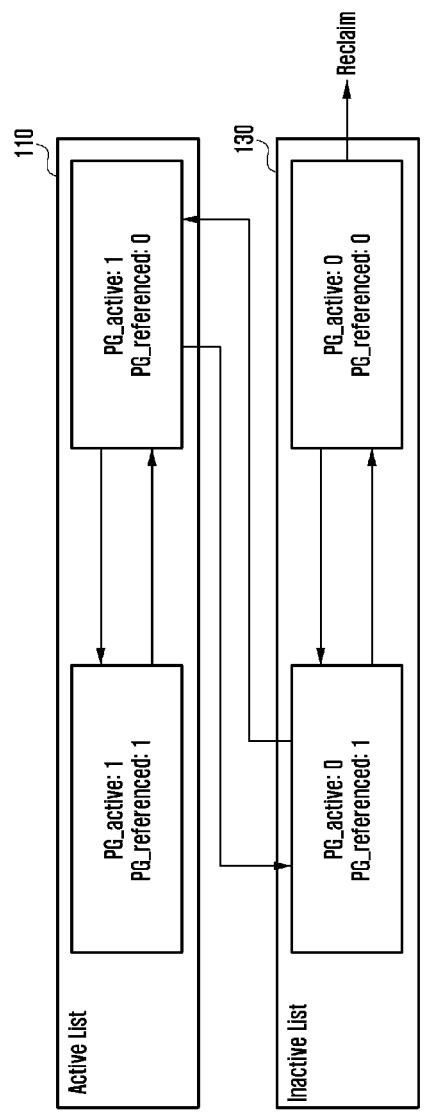
FIG. 1 is a diagram that describes a memory reclamation method based on the $2^{nd}$ chance algorithm in an Operation System (OS) according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In order to enhance the performance of a memory manager of a software operating system (OS), the embodiment of the present disclosure provides a hardware memory manager accelerator that separates part of at least one of the memory allocation or release function, the memory reclamation function, and the memory compact function from the software memory manager function and executes the separated functions as hardware functions.

The following description explains the function and operation of a memory manger that runs based on software, in order to compare with a hardware memory manager accelerator. The memory manager function of an OS running based on software is classified into memory allocation and release, memory reclamation, and memory compaction.

Memory Allocation and Release Function

When allocating memory, the total memory is divided into partitions each of which has a specific size (e.g., 4 Kbytes) and managed. The size of one page is determined by the specific size, 4 Kbyte. The total number of pages is determined according to the total size of memory. Linux as an OS uses a buddy allocator as a memory allocation and release method.

The buddy allocator manages allocable free pages on the respective lists, based on consecutive series ($2^n$, n=0 to 10). $2^n$ consecutive pages are managed on the respective lists, e.g., one page for n=0, two consecutive pages for n=1, four consecutive pages for n=2, etc. The first page frame numbers of the consecutive pages are managed on the list.

When memory allocation is requested, the first free page is immediately allocated from the free list corresponding to the allocated size. When the requested size of list does not have a free page, a free page is selected from the upper free list and split into halves to allocate the memory by the requested size and the remaining free pages are registered in a free list of a corresponding size. For example, when a size requested for allocation is n=4, a search is made to find 16 ($=2^4$) consecutive pages and the allocation is performed. First, a free list of n=4 is searched for a free page. When the fee list has a free page, the first free page of list is allocated. When the free list of n=4 has not a free page, the free page is allocated to the free list in order of n=5, 6, 7, . . . , 10. When allocation is made to pages by a requested length of n=4, the remaining free pages migrate to a free list of a corresponding size.

When performing memory release, memory pages requested for release are returned to a free list of a corresponding size. When the returned free list has consecutive pages, the pages are coalesced and moved to the upper free list. The searching is repeated until pages to be coalesced are removed.

Memory Reclamation

Linux as an OS employs the $2^{nd}$ chance technique (algorithm) and the Least Recently Used (LRU) list as a memory reclamation method.

FIG. 1 is a diagram that describes a memory reclamation method based on the $2^{nd}$ chance technique in an OS according to an embodiment of the present disclosure.

Referring to FIG. 1, the $2^{nd}$ change technique reclaims memory in use, by an Inactive List 130 and an Active List 110, in a way allowing a chance two times before memory reclamation. When an access occurs to a page, the memory manager registers the corresponding page in the Active List, and registers pages in the Inactive List each time that a memory reclamation operation is fulfilled, so that the real memory reclamation for the pages registered in the Inactive List is performed.

Figure 2:
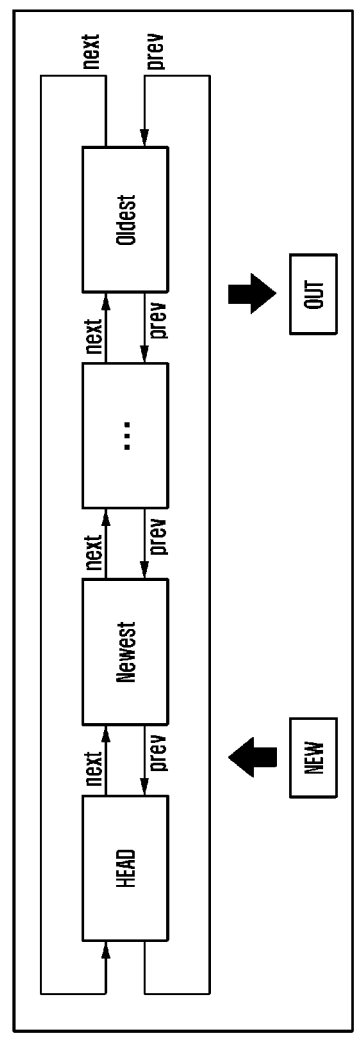
FIG. 2 is a diagram that describes a memory reclamation method based on a Least Recently Used (LRU) list in an OS according to an embodiment of the present disclosure.

FIG. 2 is a diagram that describes a memory reclamation method based on the LRU list in an OS according to an embodiment of the present disclosure.

Referring to FIG. 2, the LRU list manages lists in order of registration from latest and is set so that the oldest page is reclaimed when reading pages out of the list. This page reclamation method makes it for the software-based memory reclamation to select pages as a reclamation target in order of page from the oldest accessed page, without reclaiming the recently accessed page.

Memory Compact Function

Figure 3:
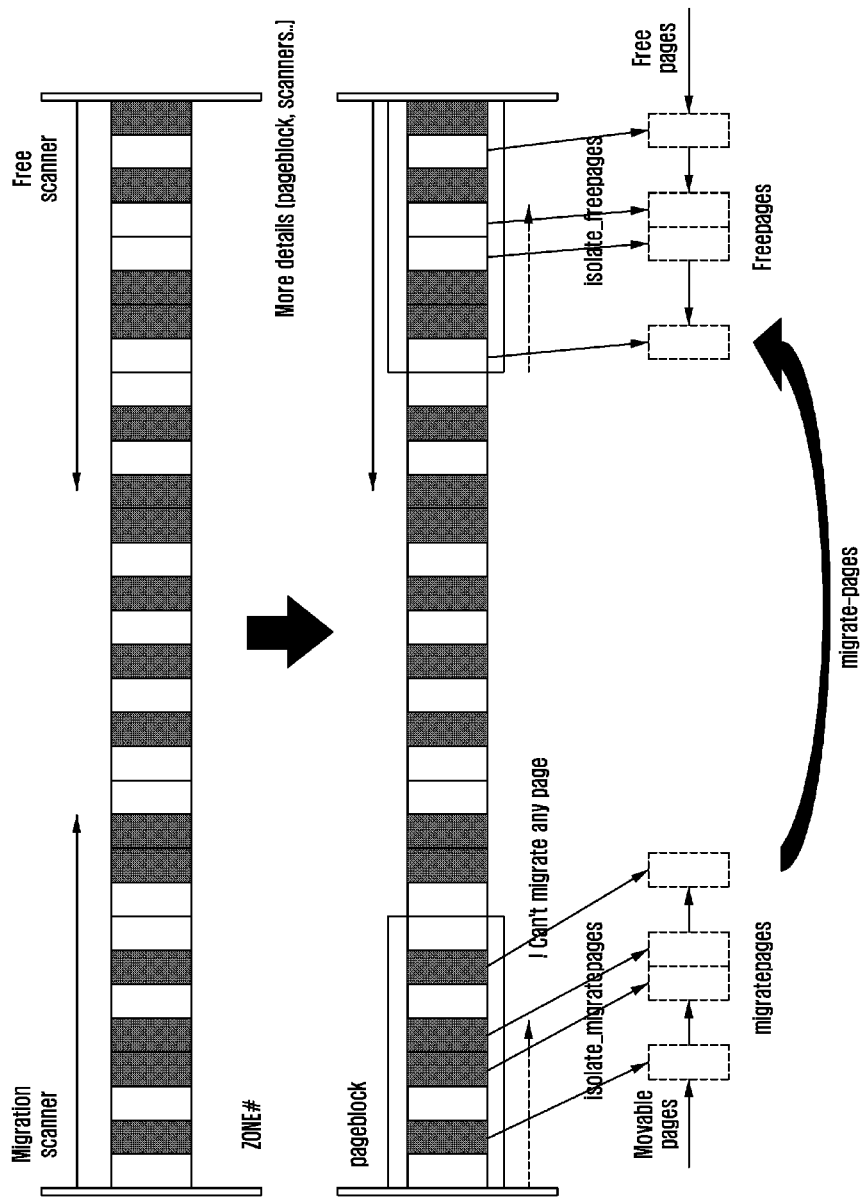
FIG. 3 is a diagram that describes a memory compaction operation in an OS according to an embodiment of the present disclosure.

FIG. 3 is a diagram that describes a memory compaction operation in an OS according to an embodiment of the present disclosure. When Linux as an OS running based on software does not perform memory allocation in response to a successive memory request, it provides a memory compaction function that moves memory in use to memory not in use and secures consecutive memory space. The memory compaction function is operated as follows.

The memory compaction operations are fulfilled by zones of memory. A zone is divided into page blocks of 1024 consecutive pages. Compaction performs a searching operation by a unit of page block and generates a migration page list and a free page list. That is, a migration scanner makes a search from the smallest page number and generates a migration page list of pages in use as moving targets. In addition, a free scanner makes a search for free pages not in use from the largest page number and generates a free page list to which the migrate page list searched by the migration scanner will be moved. With performing compactions of 32 pages, a determination is made as to whether consecutive pages of a requested length may be allocated and this process is repeated until consecutive pages of a requested length are allocated. During the repetition, when the migration scanner and the free scanner search for the same page, the compaction operation is stopped.

The software-based memory management described above has drawbacks as follows.

Figure 4:
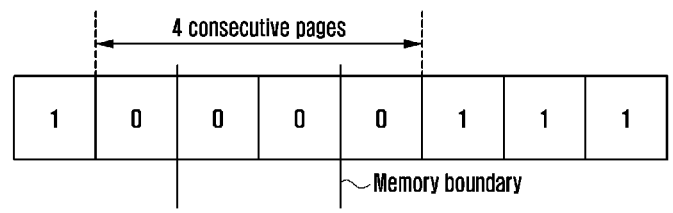
FIG. 4 is a diagram that describes a state where a memory page has been allocated and a state where the allocation state has been released according to an embodiment of the present disclosure.

FIG. 4 is a diagram that describes a state where a memory page has been allocated and a state where the allocation state has been released according to an embodiment of the present disclosure.

OS allocates memory by a size of requested order, i.e., to consecutive memory pages $2^{order}$. Therefore, since each of the pages is allocated by a unit of $2^{order}$, the boundary of allocation memory is generated every a unit of $2^{order}$. When free pages exist including an allocation boundary, although free memory page of a size of the higher order exists, allocation to the memory cannot be performed because of the allocation boundary.

Referring to FIG. 4, four consecutive free memory pages are in the middle of the memory pages.

However, the free list registers states as 2 for order=0 and 1 for order=1. When a request is made to allocate consecutive memory pages of a size of order=2, a fragmentation where allocation cannot be performed occurs. That is, although there are four free pages, since the boundary between memory allocated by a unit of $2^{nd}$ is determined, allocation for consecutive memory pages of order=2 cannot be performed.

The operating system-based memory reclamation has two drawbacks as follows. One is that the secured size of memory cannot be guaranteed because of reclaimed pages. As described above, the size of one page is fixed (e.g., 4 Kbytes). If memory needs a size of 16 Kbytes, four consecutive pages are required. However, since the memory reclamation technique of OS reclaims memory in order of pages from the oldest page without checking the continuity of pages, the number of pages to be reclaimed cannot be estimated to secure a proper size.

Another is that the reclamation time period is increased by the drawback described above. The purpose of memory reclamation is to secure necessary memory. To this end, related-art techniques try to repeatedly perform reclamation and determine whether to secure proper memory. This causes the increase in reclamation request, thereby causing a problem that reclaims pages more than necessary memory space.

The operating system-based memory compaction has a drawback as follows. Memory pages using lower page frame numbers for zone migrate to free memory pages of higher page frame numbers until consecutive memory of a size of a requested order is secured. Since memory pages in use migrate in order from the first, without checking a state where consecutive pages may be secured, the number of memory pages that is migrating and in use increases to secure consecutive memory pages of a requested size. The more the number of memory pages the more the period of time to allocate requested pages. Therefore, the execution speed of a program requesting the allocation is decreased.

Embodiments of the present disclosure provide a hardware memory manager accelerator that accelerates a function of a memory manager of an OS that is running as software, and a memory management method by using the accelerator.

Figure 5:
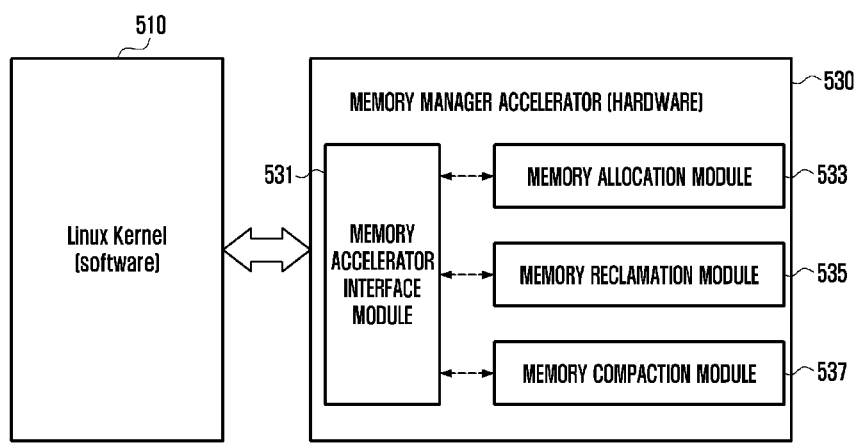
FIG. 5 is a diagram that describes a hardware memory manager accelerator according to an embodiment of the present disclosure.

FIG. 5 is a diagram that describes a hardware memory manager accelerator 530 according to an embodiment of the present disclosure. The hardware memory manager accelerator 530 includes a memory accelerator interface module 531 cooperating with software OS 510, a memory allocation module 533 for accelerating memory allocation, a memory reclamation module 535 for accelerating a memory reclamation function, and a memory compaction module 537 for accelerating a memory compaction function. Meanwhile, in the embodiment of the present disclosure, it should be understood that the hardware memory manager accelerator 530 not necessarily includes the memory allocation module 533, the memory reclamation module 535, and the memory compaction module 537. That is, the embodiment of the present disclosure may be modified in such a way that the hardware memory manager accelerator 530 may include part of the modules. In addition, the embodiment may be modified in such a way that the modules control not their operations respectively but a controller for controlling the entire operation of the hardware memory manager accelerator 530 controls the operations of the respective modules.

The hardware memory manager accelerator 530 runs as a hardware configuration that makes an interface with a memory management function of an OS running as software and performs mutual operations. The hardware memory manager accelerator 530 may include four function modules. Memory accelerator Interface Module (MIM) 531 provides an interface with software OS. Memory Allocation Module (MAM) 533 accelerates memory allocation and release functions. Memory Reclaim Module (MRM) 535 accelerates a memory reclamation function that is generated when being short of memory. Memory Compaction Module (MCM) 537 accelerates a compaction function of migrating memory in use to secure consecutive memory space when being short of memory.

According to embodiments of the present disclosure, the respective modules are described in detail as follows.

According to an embodiment of the present disclosure, the Memory Allocation Module (MAM) 533 may perform control operations to generate zone information and page information based on initialization information transferred from the software OS 510, to receive a memory allocation request message including information about allocation requested memory size and zone indicating information from the software OS, to extract allocation indicator bit sequence information about a page of a zone indicated by the zone indicting information based on the zone information and page information, and to allocate memory request for allocation based on the allocation indicator bit sequence information.

In addition, the Memory Allocation Module (MAM) 533 may perform a control operation: to search for free pages to allocate the memory requested for allocation based on the allocation indicator bit sequence information. In addition, the MAM 533 may perform a control operation to search for consecutive free pages from the allocation indicator bit sequence information by using a search window corresponding to the allocation request memory size information.

In addition, the MAM 533 may perform a control operation to search for the entire bit sequence by using the search window and to search for the allocation indicator bit sequence by moving the search start position by 1 bit.

In addition, when free pages more than the size of the memory requested for allocation has been searched, the MAM 533 may perform a control operation to stop the searching. In addition, the MAM 533 may perform a control operation so that the memory requested for allocation transfers a page allocation complete message including the first page frame number of an allocated page to the software OS.

According to an embodiment of the present disclosure the MRM 535 may perform control operations to receive a reclamation target page request message from the software OS; to generate search information based on a reclamation target zone and LRU information; to select a reclamation target page group including the largest consecutive pages from the search information; and to transfer a reclamation target page selection complete message including the reclamation target page group information to the software OS.

The reclamation target page request message may include zone information and LRU indicator. The search information may include bitmap information indicating allocation information about pages, corresponding to the LRU indicator and the zone information.

In addition, in order to select the reclamation target page group, the MRM 535 may perform control operations to search for consecutive pages from a reclamation group, with the setting of 32 bit sequence (a first searching operation) and to search for consecutive pages, without the setting of 32 bit sequence (a second searching operation).

The reclamation target page group information may include the first page frame number of a reclamation target page group and the allocation information about the reclamation target page group.

According to an embodiment of the present disclosure, the MCM 537 may perform control operations to receive a compaction request message including a compaction indicator from the software OS; to search for a page block bit sequence corresponding to the compaction indictor; to select a compact target page block based on the number of free pages in the page block; and to transfer a compaction complete message including information about the selected page block to the software OS.

In addition, when the compaction request message is a message for requesting a migration page block, the MCM 537 may perform a control operation to select one of the page blocks that has the minimum number of free pages as the compaction target page block.

When the compaction request message is a message for requesting a free page block, the MCM 537 may perform a control operation to select one of the page blocks that has the maximum number of free pages as the compaction target page block.

In addition, the MCM 537 may perform control operations to select, when a page block to be selected has been selected as a free page block or a migration page block, the next highest ranked page block as a compaction target page block; and to select, when a page block to be selected has not been selected as a free page block or a migration page block, the page block as a compaction target page block. The compaction complete message may include information about the page frame of the compaction target page block and the compaction indicator.

Although the embodiment of the present disclosure is implemented in such a way that the MIM 531, MAM 533 and MRM 535 are separated and perform corresponding functions respectively, it should be understood that the controller of the hardware memory manager accelerator 530 may perform the operations of the respective modules. It should also be understood that the respective modules and the memory manger accelerator are not limited to the types of operations described above. That is, the respective modules and the memory manger accelerator may control operations of the following embodiments shown in FIGS. 6 to 27.

The hardware memory manager accelerator 530 manages data described in the following tables in order to fulfill acceleration functions in the hardware configuration. Table 1 describes zone information, Zone_info.

TABLE 1

| Member variables | size | Description |
| --- | --- | --- |
| Zone_id | 32 bits | Zone identifier<br>0x01: Normal zone<br>0x02: Highmem zone<br>0x03: DMA32 zone<br>0x04~FFFF: Reserved |
| Zone_start_page_pfn | 32 bits | start page frame number of a zone |
| Zone_end_page_pfn | 32 bits | End page frame number of a zone |

The zone information, Zone_info, includes zone identifier indicating a type of zone, zone_id; zone start page information indicating the boundary of a zone, zone_start_page_pfn; and zone end page information, zone_end_page_pfn. The zone information, Zone_info, is new information that the software OS provides to the hardware memory manager accelerator 530 so that the hardware memory manager accelerator 530 manages memory.

The following table 2 describes hardware page information to manage information about pages of the respective zones.

TABLE 2

| Member Variables | Size | Description |
| --- | --- | --- |
| Alloc_indicator | 1 bit | Indicates A page is allocated or free<br>0: Free page<br>1: Allocated page |
| Migrate_type | 3 bits | Indicate type of migrate of a page<br>0x00: Reserved<br>0x01: Migrate_unmovable<br>0x02: Migrate_reclaimable<br>0x03: Migrate_movable<br>0x04: Migrate_pcptypes<br>0x05: Migrate_reserve<br>0x06~: Reserved |
| Lru_indicator | 2 bits | Indicate type of LRU list a page belongs to<br>0x00: not in any LRU list<br>0x01: anonymous inactive LRU list<br>0x02: file inactive LRU list |

The hardware memory manager accelerator 530 generates and manages items of hardware page information for managing information about pages of the respective zones, hw_page_info, as the number of pages. The hardware page information, hw_page_info, includes an allocation indicator indicating allocation and release states of pages, alloc_indicator; and migration type information indicating a migration type of a page, migrate_type. The hardware page information, hw_page_info, is new information that the software OS provides to the hardware memory manager accelerator 530 so that the hardware memory manager accelerator 530 manages memory.

The following table 3 describes page block-related information.

TABLE 3

| Member Variables | Size | Description |
| --- | --- | --- |
| Num_free_pages | 32 bits | Total number of free pages in a page block |
| Migrate_type | 3 bits | Indicate type of migrate of a page<br>0x00: Reserved<br>0x01: Migrate_unmovable<br>0x02: Migrate_reclaimable<br>0x03: Migrate_movable<br>0x04: Migrate_pcptypes<br>0x05: Migrate_reserve<br>0x06~: Reserved |
| Selected_indicator | 1 bits | Indicate if a page block is selected or not as migrated page block or freed paged block<br>0: not selected<br>1: selected |

Each zone is divided into page blocks. One page block includes 1024 consecutive pages and data of page block-related information, pb_info. The page block-related information, pb_info, includes information about the number of the free pages that have been allocated in page blocks, num_free_pages; and information about a migration type of a corresponding page block, migrate_type. In addition, the page block-related information, pb_info, may further include information about a selection indicator indicating whether a corresponding page block has been selected, selected_indicator.

FIGS. 6A and 6B are diagrams that describe signal exchange information between a memory manager accelerator interface module and a software operation system according to an embodiment of the present disclosure.

Referring to FIGS. 6A and 6B, the interfaces may exchange information between the software OS and the hardware accelerator by using a preset register of the memory accelerator.

In the following embodiments, for the sake of convenience, MAM, MRM, MCM and their functions are described separately. It will be, however, appreciated that the respective modules may cooperate with other modules.

Referring to FIGS. 7 to 12, the MAM is described. When the software OS allocates or releases memory, the MAM accelerates the functions.

Figure 7:
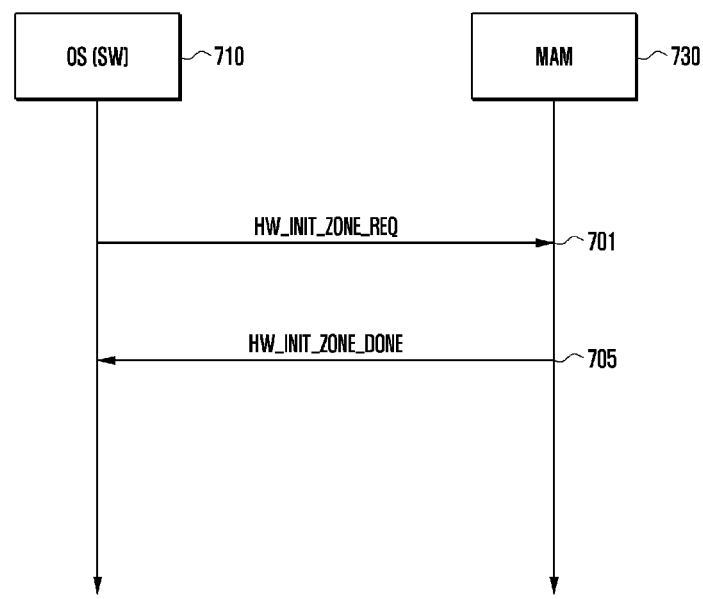
FIG. 7 is a diagram that describes a zone initialization interface according to an embodiment of the present disclosure.
Figure 8:
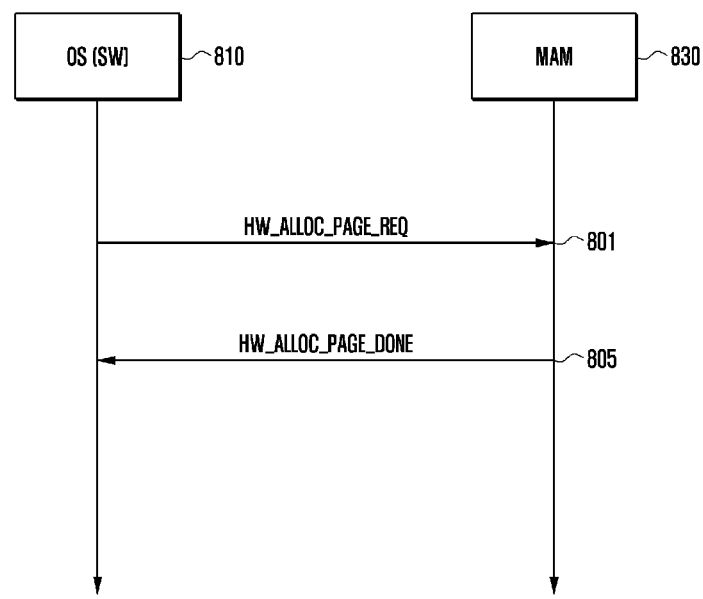
FIG. 8 is a diagram that describes a memory allocation request interface according to an embodiment of the present disclosure.
Figure 9:
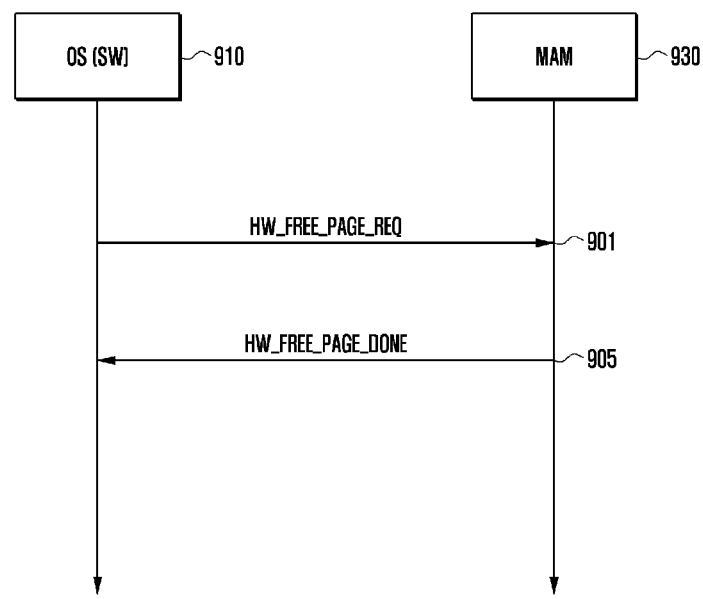
FIG. 9 is a diagram that describes a memory release request interface according to an embodiment of the present disclosure.

Referring to FIGS. 7 to 9, interface between the software OS and the MAM is described as follows.

FIG. 7 is a diagram that describes a zone initialization interface according to an embodiment of the present disclosure.

Referring to FIG. 7, when the software OS 710 initializes the respective zones of memory, it transfers a hardware initialization zone request message, HW_INIT_ZONE_REQ, to the MAM 730 of the memory manager accelerator at operation 701. The MAM 730 generates zone information, zone_info, and hardware page information, hw_page_info, and initializes values of members of data structures, by using start page information, start_pfn, end page information, end_pfn, and a zone identifier, zone_id, transferred through the received hardware initialization zone request message, HW_INIT_ZONE_REQ. The MAM 730 completes the initialization, and informs the software OS 710 of the initialization complete through a hardware zone initialization message HW_INIT_ZONE_DONE at operation 705.

FIG. 8 is a diagram that describes a memory allocation request interface according to an embodiment of the present disclosure.

Referring to FIG. 8, when the software OS 810 allocates memory, it makes a memory allocation request by transferring a hardware page allocation request message, HW_ALLOC_PAGE_REQ, to the MAM 830 of the memory manager accelerator at operation 801. The transferred information includes a zone identifier indicating a type of zone, zone_id; order indicating a requested allocation size; and information about a migration type of page, migrate_type. The MAM 830 may allocate memory based on the received information. The MAM 830 may allocate consecutive memory as many as the size of $2^{order}$ requested, by using a bitmap-based page allocation algorithm. The MAM 830 transfers the first page frame number of an allocated page, as allocated information, to the software OS 810 through a hardware page allocation complete message HW_ALLOC_PAGE_DONE at operation 805.

FIG. 9 is a diagram that describes a memory release request interface according to an embodiment of the present disclosure.

Referring to FIG. 9, when the software OS 910 releases memory in use, it makes a memory release request by transferring a hardware free page request message, HW_FREE_PAGE_REQ, to the MAM 930 of the memory manager accelerator at operation 901. The transferred information includes a zone identifier indicating a type of zone, zone_id, and free page number information about memory pages to be released, freed_pfn. By using the information, the MAM 930 sets the allocation indicator, alloc_indicator, of the hardware page information, hw_page_info, mapped to the transferred free page number information, freed_pfn, to zero '0'. After completing the setting, the MAM 930 informs the software OS 910 of the release complete through a hardware free page complete message HW_FREE_PAGE_DONE at operation 905.

Figure 10A:
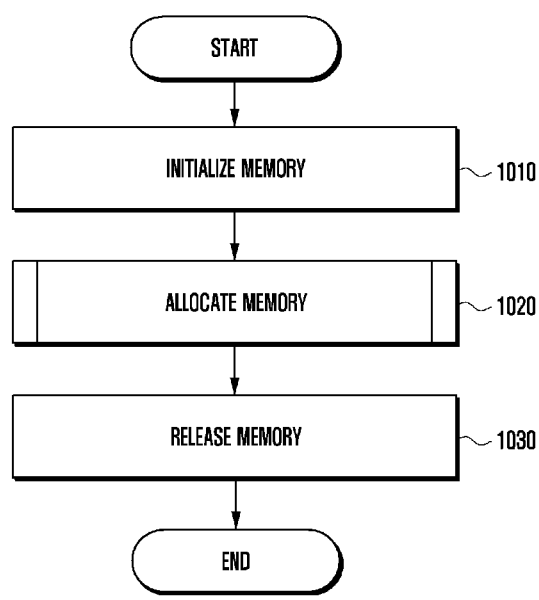
FIGS. 10A, 10B, 10C, and 10D are flow charts that describe a memory allocation method according to an embodiment of the present disclosure.
Figure 10B:
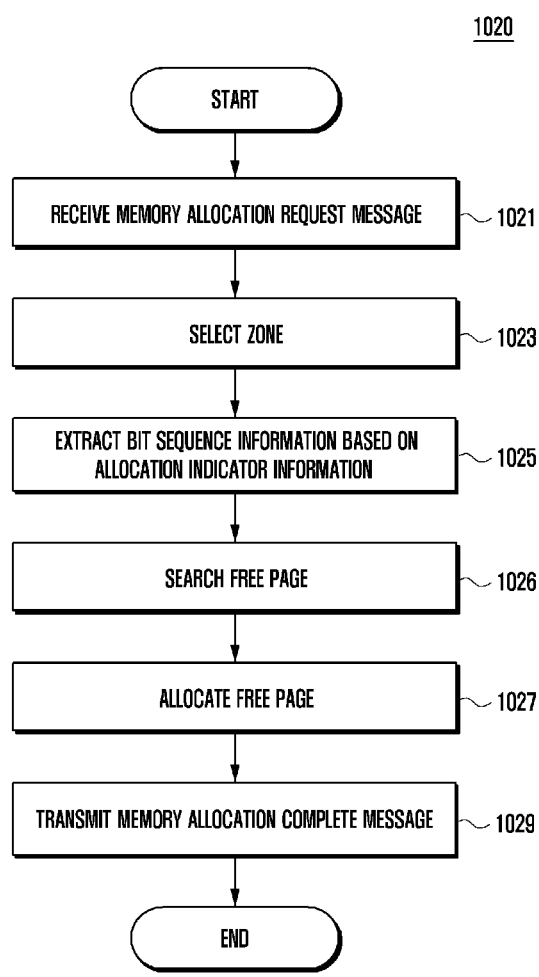
Figure 10C:
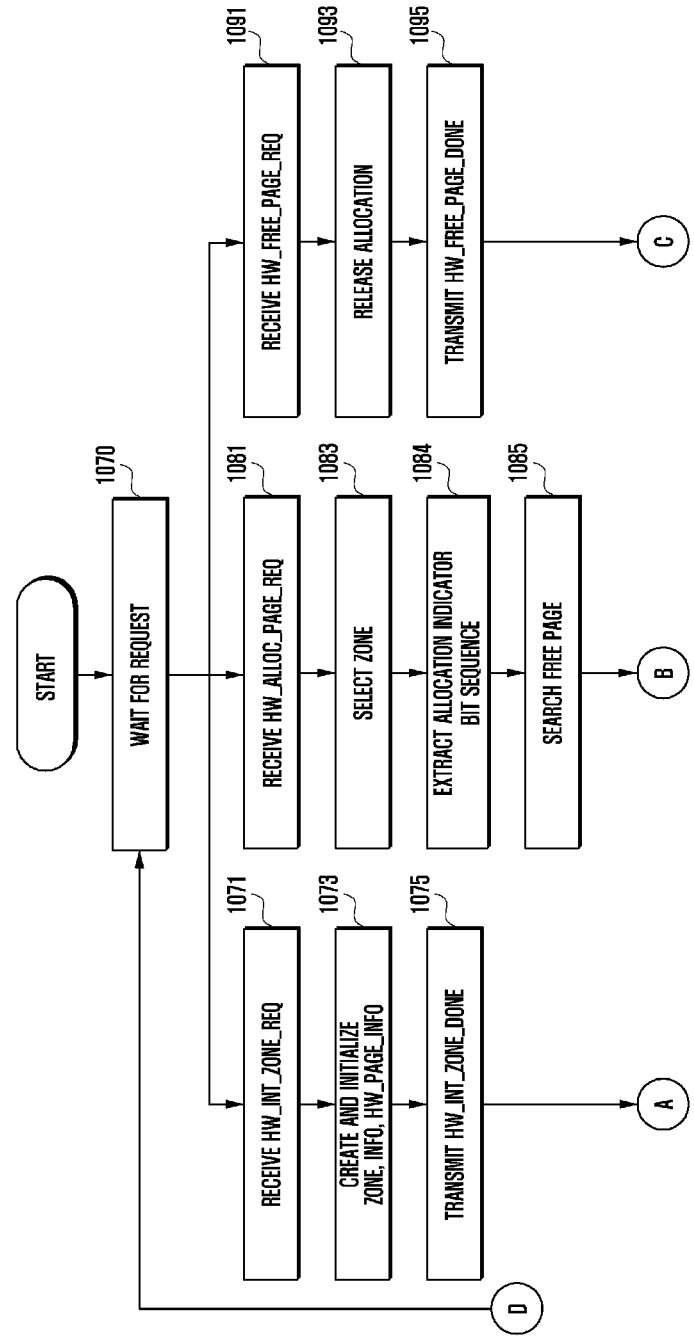
Figure 10D:
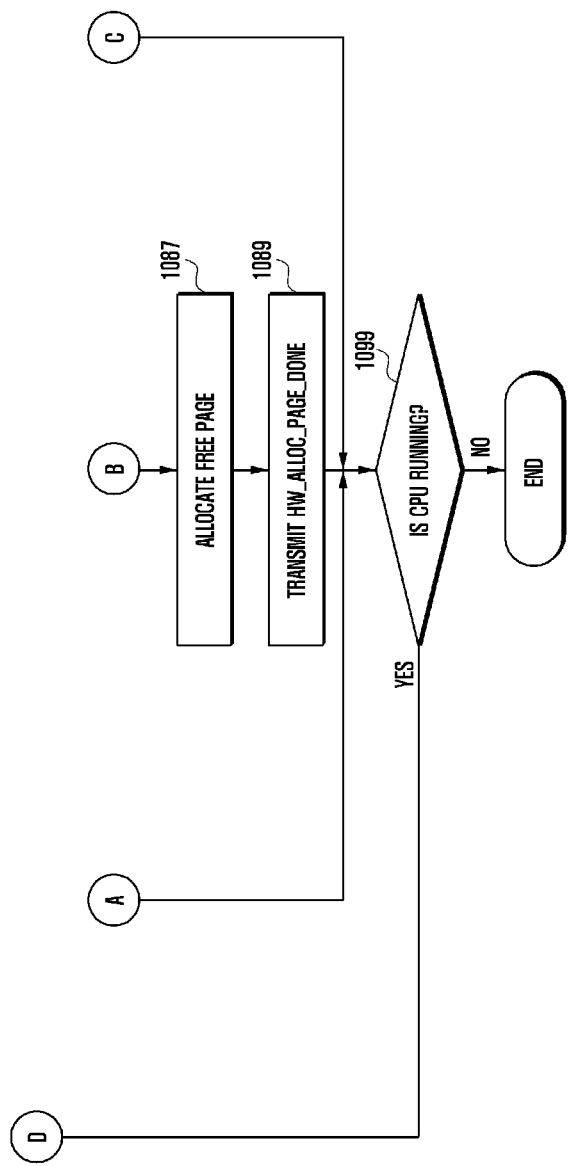
Figure 11:
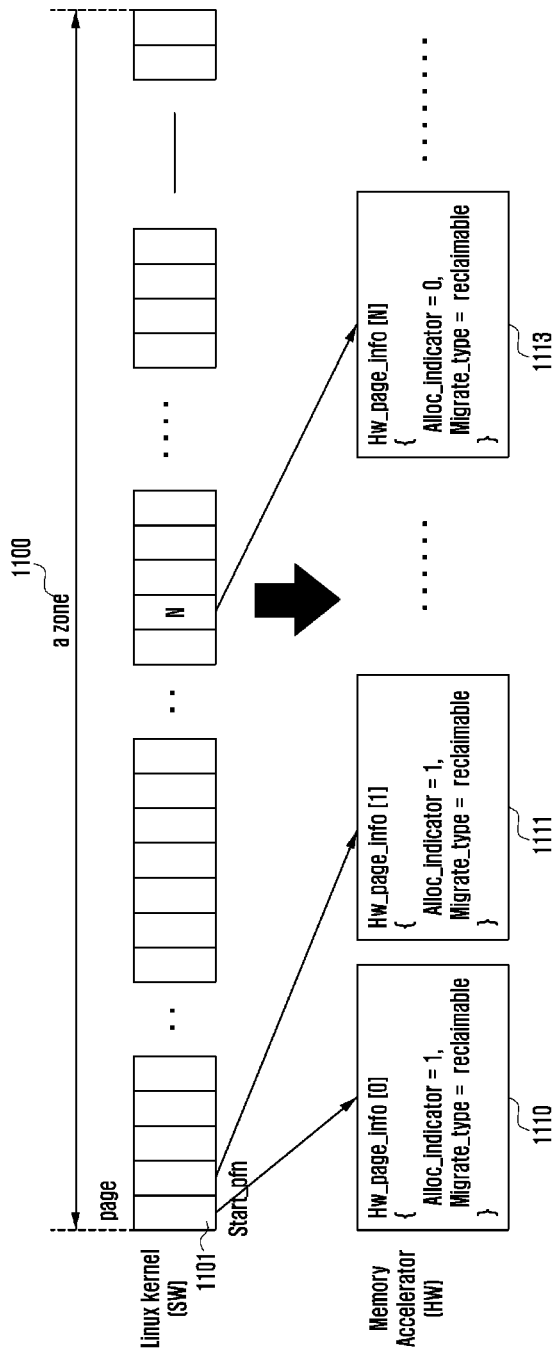
FIG. 11 is a diagram that describes hardware page information about a memory page of a memory zone according to an embodiment of the present disclosure.
Figure 12:
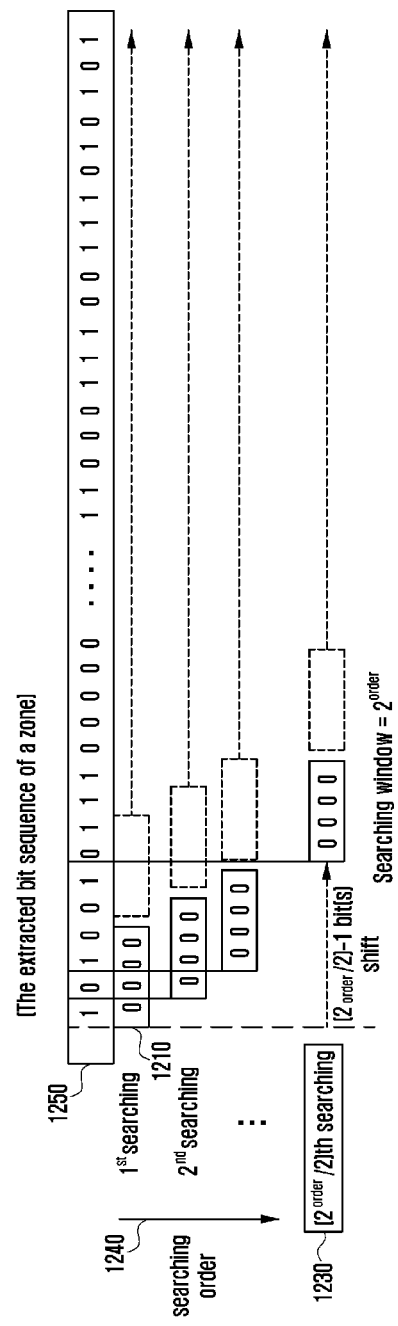
FIG. 12 is a diagram that describes a free page search method according to an embodiment of the present disclosure.

Referring to FIGS. 10 to 12, memory allocation according to an embodiment of the present disclosure is described in detail as follows.

FIGS. 10A to 10D are flow charts that describe a memory allocation method according to an embodiment of the present disclosure.

FIG. 11 is a diagram that describes hardware page information about a memory page of a memory zone according to an embodiment of the present disclosure.

FIG. 12 is a diagram that describes a free page search method according to an embodiment of the present disclosure.

Referring to FIG. 10A, MAM may perform an initialization operation based on the hardware initialization request message, HW_INT_ZONE_REQ, from the software OS at operation 1010. Operation 1010 was described as shown in FIG. 7.

MAM may perform a memory allocation operation based on the hardware page allocation request message, HW_ALLOC_PAGE_REQ, from the software OS at operation 1020. Operation 1020 was described as shown in FIG. 8.

MAM may perform a memory release operation based on the hardware free page request message, HW_FREE_PAGE_REQ, from the software OS at operation 1030. Operation 1030 was described as shown in FIG. 9.

MAM may perform initialization, memory allocation, and memory release, in an electronic device using memory, through operations 1010, 1020, and 1030.

Referring to FIG. 10B, the memory allocation operation is described in detail as follows. According to an embodiment of the present disclosure, MAM may allocate pages based on a bitmap method.

As shown in FIG. 11, information about a specific zone may be configured.

Referring to FIG. 11, a zone 1100 may include a plurality of pages. For the respective pages, the state of a page (e.g., 1101) may be managed by information (1110, 1111, and 1113) about hardware page information hw_page_info. Each time that each page is allocated or released, the allocation indicator, alloc_indicator, of the hardware page information hw_page_info of the page is set to '1 (allocation)' or '0 (release).'

When the hardware page allocation request message HW_ALLOC_PAGE_REQ is transferred from the software OS to the MAM of the memory manager accelerator, the bitmap-based page allocation algorithm starts at operation 1021. The MAM may perform an allocation operation by using a zone identifier zone_id, order, and migration type, migrate_type, transferred from the software OS. The MAM selects a zone corresponding to the zone identifier zone_id, by using the information transferred through the hardware page allocation request message at operation 1023.

The MAM extracts bit sequence of an allocation indicator, alloc_indicator, from hardware page information, hw_page_info, about pages of the selected zone at operation 1025. That is, for information about the respective pages, an allocation indicator of the allocated page may be set to '1' and an allocation indicator of the free page may be set to '0.' The allocation indicator leads to extract a bit sequence 1250 as shown in FIG. 12.

After extracting the bit sequence, the MAM may start to search free pages at operation 1026. When searching free pages, the MAM may find out as many consecutive free pages as the requested size of $2^{order}$. The free page search method will be described in detail later referring to FIG. 12.

When the MAM ascertains, through the free page searching, that there are as many consecutive free pages as $2^{order}$ requested by the software OS, it allocates searched free pages at operation 1027. The MAM may transfer a hardware allocation page complete message HW_ALLOC_PAGE_DONE to the software OS at operation 1029. The MAM may transfer the first page frame number of an allocated page, as allocated information, to the software OS by using a hardware allocation page complete message HW_ALLOC_PAGE_DONE.

The method of searching as many free pages as the requested size from the bit sequence extracted from a selected zone is described as follows. Referring to FIG. 12, the MAM may search consecutive free pages of a requested size, by using a searching window 1210 of a $2^{order}$ length, by moving the extracted allocation indicator bit sequence 1250 by the window size. The entire bit sequence is repeatedly searched $2^{order}/2$ times at operation 1230. The search start position is sifted by 1 bit from the previous start position each time the search operation is repeated at operation 1240. When the free pages of a requested size have been found during the searching operation, the searching operation is stopped. In addition, the MAM indicates that allocation has been done, by setting the allocation indicator, alloc_indicator, of the hardware page information of pages, hw_page_info, corresponding to the searched bit sequence, to '1.'

FIGS. 10C and 10D describe a memory allocation method based on received messages according to an embodiment of the present disclosure. Operations 1070, 1071, 1073, 1075 and 1099 of FIGS. 10C and 10D may correspond to operation 1010 of FIG. 10A. Operations 1070, 1081, 1083, 1084, 1085, 1087, 1089 and 1099 of FIGS. 10C and 10D may correspond to operation 1020 of FIG. 10A. Operations 1070, 1091, 1093, 1095 and 1099 of FIGS. 10C and 10D may correspond to operation 1030 of FIG. 10A.

Figure 13:
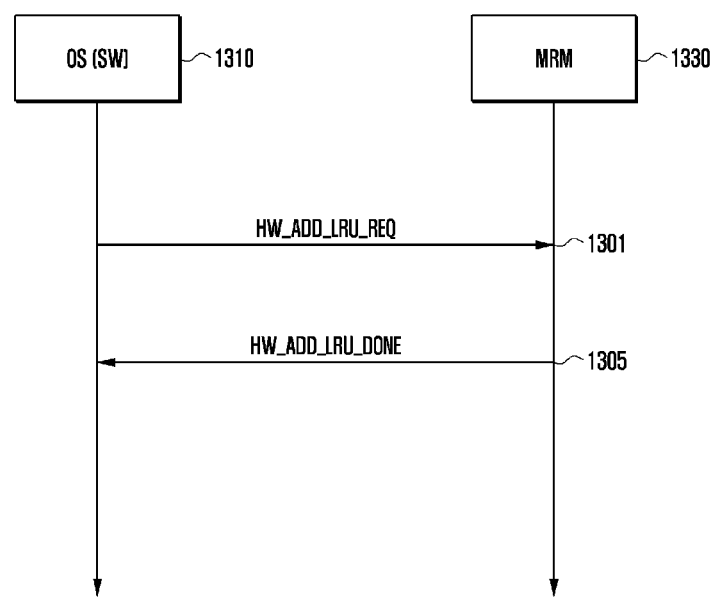
FIG. 13 is a diagram that describes an interface for registering memory pages in an LRU list according to an embodiment of the present disclosure.
Figure 14:
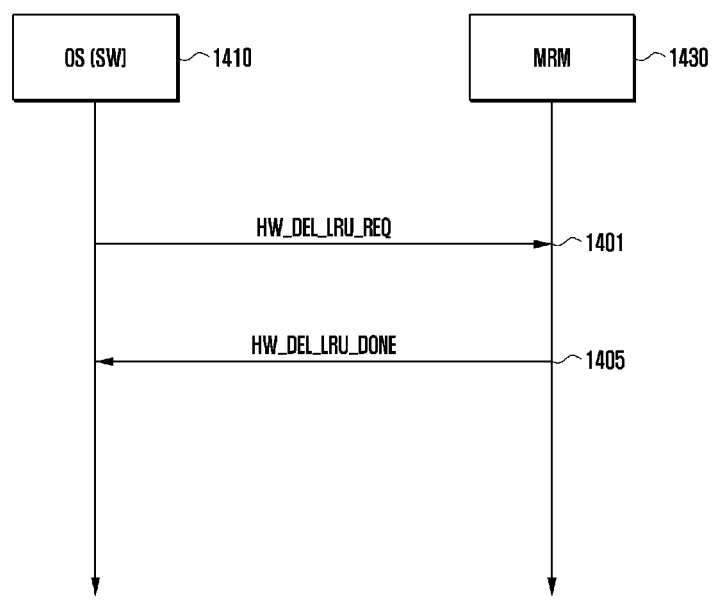
FIG. 14 is a diagram that describes an interface for deleting memory pages from an LRU list according to an embodiment of the present disclosure.
Figure 15:
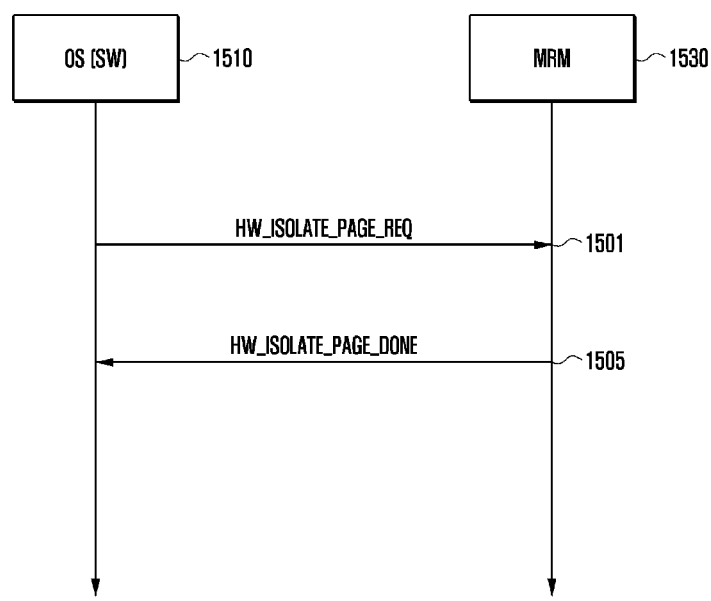
FIG. 15 is a diagram that describes an interface for requesting a candidate group of reclamation target pages according to an embodiment of the present disclosure.

Referring to FIGS. 13 to 19, the MRM is described as follows. When the software OS performs memory reclamation, the MRM accelerates the function. Referring to FIGS. 13 to 15, interface between the software OS and the MRM is described as follows.

FIG. 13 is a diagram that describes an interface for registering memory pages in an LRU list according to an embodiment of the present disclosure.

Referring to FIG. 13, the MRM 1330 manages memory pages used in the software OS 1310 through a LRU list. When the memory pages are registered from an active LRU list to inactive LRU list, the software OS 1310 informs the MRM 1330 of the registration through the interface as shown in FIG. 13. The software OS 1310 transfers a hardware addition LRU request message, HW_ADD_LRU_REQ, to the MRM 1330 at operation 1301. The hardware addition LRU request message, HW_ADD_LRU_REQ, transfers zone identifier indicating a type of zone, zone_id, an LRU indicator indicating a type of LRU list, lru_indicator, and page frame number information, pfn, as registered memory page frame numbers. The MRM 1330 changes LRU indicator, lru_indicator, of hardware page information, hw_page_info, of requested memory page, to requested LUR indicator, lru_indicator, by using requested information, and thus registers and manages a corresponding memory page in the requested LRU list. After completing the registration, the MRM 1330 informs the software OS 1310 that requested operation has been completed through a hardware addition LRU complete message HW_ADD_LRU_DONE at operation 1305.

FIG. 14 is a diagram that describes an interface for deleting memory pages from an LRU list according to an embodiment of the present disclosure. When a software OS 1410 removes a registered memory page from an inactive LRU list, the software OS 1410 informs an MRM 1430 of the page deletion through an interface as shown in FIG. 14. The software OS 1410 transfers a hardware deletion LRU request message HW_DEL_LRU_REQ to the MRM 1430 at operation 1401. The hardware LRU deletion request message HW_DEL_LRU_REQ transfers zone identifier indicating a type of zone, zone_id, an LRU indicator indicating a type of LRU list, lru_indicator, and page frame number information, pfn, as registered memory page frame numbers.

The MRM 1430 changes LRU indicator, lru_indicator, of hardware page information, hw_page_info, of requested memory page, to requested LUR indicator, lru_indicator, by using requested information, and registers (deletes) a corresponding memory page in (from) the request LRU list. After completing the registration, the MRM 1430 informs the software OS 1410 that the requested operation has been completed through a hardware LRU deletion complete message, HW_DEL_LRU_DONE at operation 1405.

FIG. 15 is a diagram that describes an interface for requesting a candidate group of reclamation target pages according to an embodiment of the present disclosure.

Referring to FIG. 15, when the software OS 1510 reclaims memory, an interface requests a list of reclamation target candidate pages in the process of selecting reclamation target pages from an inactive list.

The software OS 1510 transfers a hardware isolate page request message HW_ISOLATE_PAGE_REQ to the MRM 1530 at operation 1501. The hardware isolate page request message HW_ISOLATE_PAGE_REQ includes a zone identifier indicating a type of reclamation target zone, zone_id, and an LRU indicator indicating a type of LRU list to be searched, lru_indicator. The MRM 1530 selects a list of reclamation target candidate pages based on a page selection algorithm considering the continuity of the MRM of the memory accelerator. The MRM 1530 transfers the selected reclamation target candidate page list to the software OS 1510 through a hardware isolate page complete message, HW_ISOLATE_PAGE_DONE at operation 1505. The transferred information may include the first page frame number of the reclamation target candidate page list and bitmap information about the list.

Referring to FIGS. 16 to 19, the memory reclamation method according to an embodiment of the present disclosure is described in detail as follows.

Figure 16:
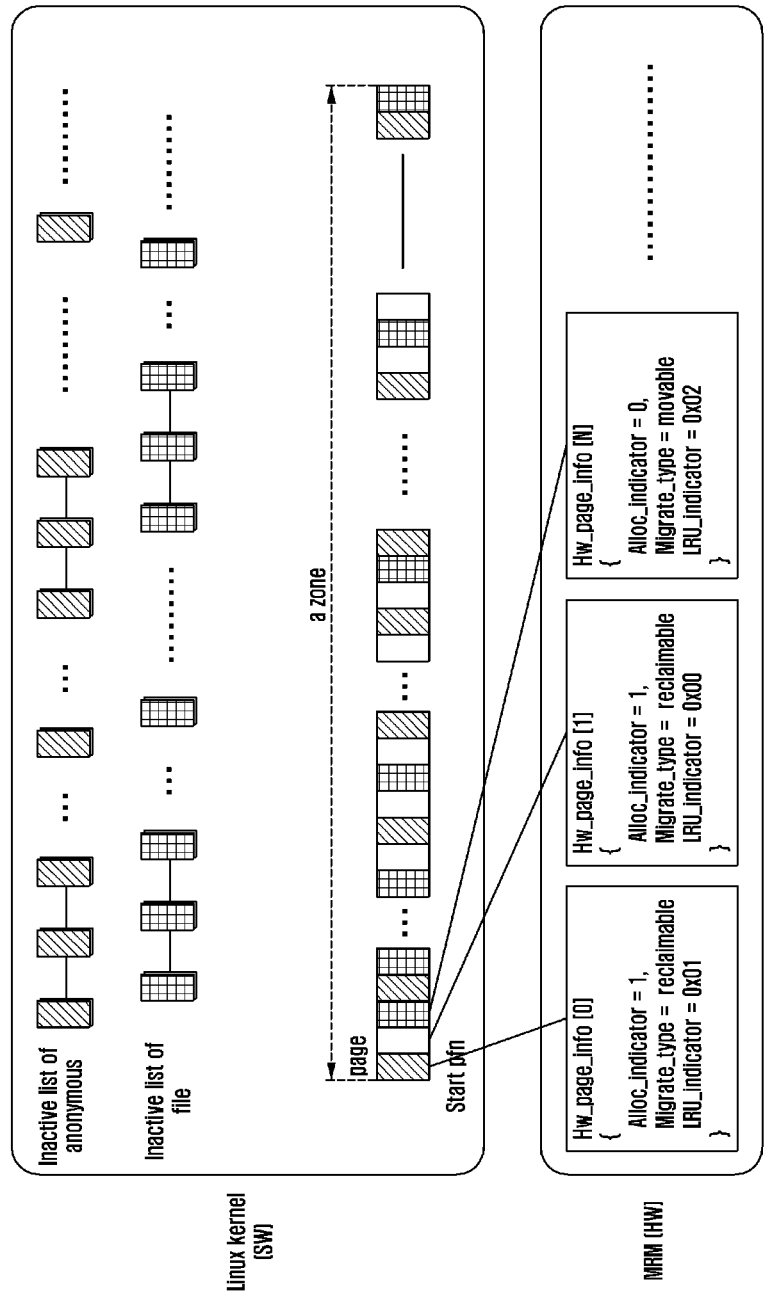
FIG. 16 is a diagram that describes a memory page registered in an inactive LRU list according to an embodiment of the present disclosure.

FIG. 16 is a diagram that describes a memory page registered in an inactive LRU list according to an embodiment of the present disclosure. In the embodiment, the MRM selects a reclamation target page considering the continuity of pages.

Figure 19A:
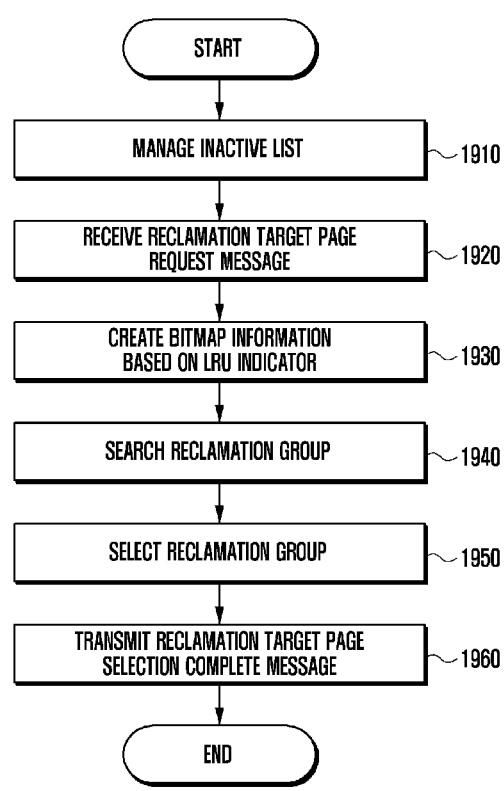
FIG. 19A is a flow chart that describes a method of selecting a reclamation target page according to an embodiment of the present disclosure.

FIG. 19A is a flow chart that describes a method of selecting a reclamation target page according to an embodiment of the present disclosure.

Referring to FIG. 19A, the MRM manages an inactive list based on a request message transferred from the software OS at operation 1910. The inactive list, as shown in FIG. 16, includes a file inactive list and an anonymous inactive list. When the software OS registers or deletes a memory page in or from the inactive LRU list, the MRM receives information to manage lists by a hardware addition LRU request message HW_ADD_LRU_REQ and a hardware deletion LRU request message HW_DEL_LRU_REQ.

The MRM uses the received information to manage an LUR indicator, LUR_indicator, of hardware page information, hw_page_info, about a corresponding page, and manages the registration and deletion of a file inactive list and an anonymous inactive list. The LUR indicator, LUR_indicator, describes a type of list that pages belonged to. The indicator may indicate that a page has not been included in any LRU list; that a page has been included in an anonymous inactive list; and that a page has been included in a file inactive list. The file inactive list refers to a list of memory pages that files are mapped to and that are in use. The anonymous inactive list refers to a list of memory pages that files are not mapped to.

The MRM receives a hardware isolate page request message HW_ISOLATE_PAGE_REQ from the software OS at operation 1920. The hardware isolate page request message HW_ISOLATE_PAGE_REQ may include a zone identifier, zone_id, indicating a type of reclamation target zone and an LRU indicator, lru_indicator, indicating a type of LRU list to be searched. That is, the MRM may generate bitmap information based on allocation information included in a list indicated by the lru_indicator of the zone_id indicated by the HW_ISOLATE_PAGE_REQ transferred from the software OS at operation 1930. For example, the MRM may generate bitmap information as shown in FIG. 17.

Figure 17:
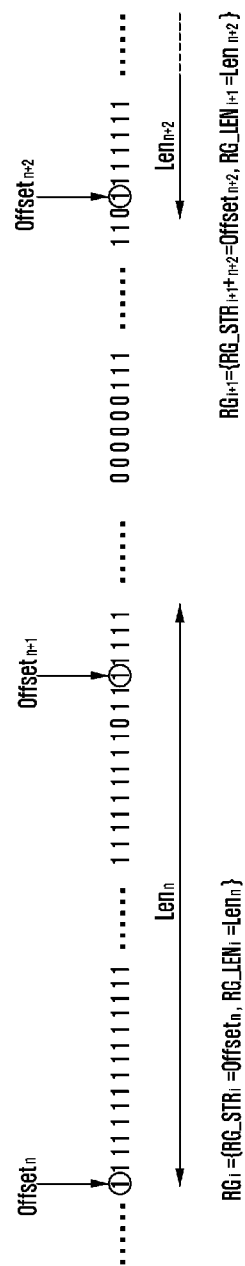
FIG. 17 is a diagram that describes a method of generating a bitmap and searching a reclamation group according to an embodiment of the present disclosure.

FIG. 17 is a diagram that describes a method of generating a bitmap and searching a reclamation group according to an embodiment of the present disclosure. The MRM may generate the bitmap shown in FIG. 17 according to whether a page list indicated by the lru_indicator is allocated. The MRM may search for a reclamation group from the next generated bitmap information at operation 1940. The method of searching for pages to select reclamation target pages by the MRM is fulfilled with two processes. In process 1, reclamation groups, $RG_i$, of consecutive pages of more than 32, aligned with 32 bit Align, and then one of the groups which includes the largest consecutive pages is first allocated. In process 2, reclamation groups, $RG_i$, of consecutive pages, not aligned with 32 bit align, and then one of the groups which includes the largest consecutive pages is first allocated.

In process 1, reclamation groups of consecutive pages that start with the alignment of 32 bit Align are searched. The searched groups are expressed as $RG_i=\{RG\_STR_i=Offset_n, RG\_LEN_i=Len_n\}$. $RG\_STR_i$ denotes the position of a bit that a group starts at, and $RG\_LEN_i$ denotes the number of consecutive pages. $RG\_STR_i$, the reclamation groups searched in process 1, denotes a position of a bit that starts, aligned with 32 bit. That is, $RG\_STR_i=0, 32, 64, \ldots$, etc. Of the values, $Offset_n$, the reclamation group of the largest consecutive pages, RG_STR, is allocated by the software OS, so that pages are reclaimed.

Figure 18:
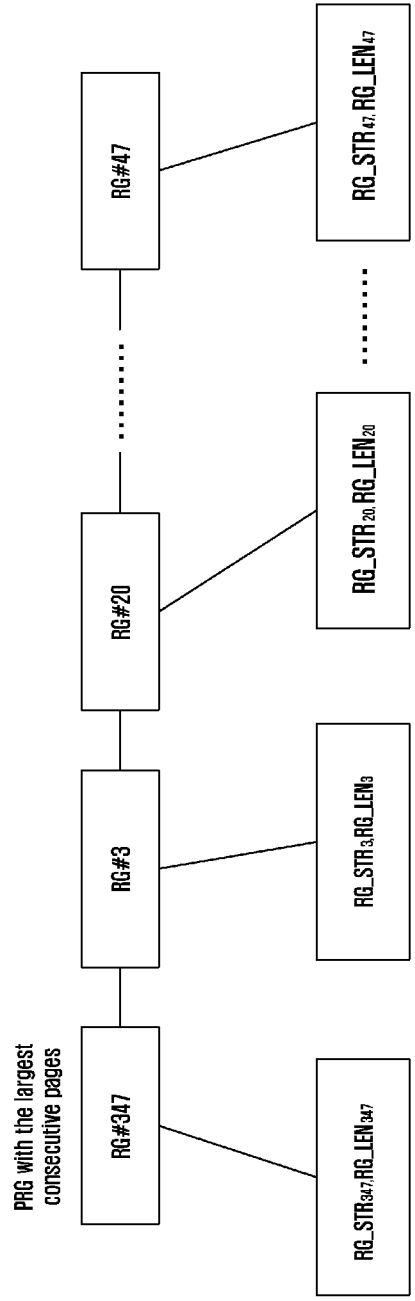
FIG. 18 is a diagram that describes an alignment method of selecting a page reclamation group according to an embodiment of the present disclosure.

FIG. 18 is a diagram that describes an alignment method of selecting a page reclamation group according to an embodiment of the present disclosure.

Referring to FIG. 18, the MRM may align searched reclamation groups. The MRM may align searched reclamation groups in order of priority. The MRM may align searched reclamation groups in order of priority, starting from the reclamation group of the largest consecutive pages.

After searching reclamation groups according to the search method described above, the MRM may select the reclamation group with the highest priority at operation 1950. When the reclamation group with the highest priority has been selected, the MRM may stop searching for a reclamation group. When a reclamation group has been selected in process 1, process 2 may be omitted.

Although the reclamation groups selected in process 1 are given priority in memory reclamation, when the software OS requests to select page groups for reclamation, process 2 may be performed. In process 2, reclamation groups of consecutive pages are searched without considering 32 bit align. In process 2, memory reclamation is performed in the same method as process 1, i.e., in such a way that reclamation groups are searched and one of the reclamation groups which includes the largest consecutive pages is first allocated.

After selecting the reclamation group, the MRM may transmits a message to the software OS, informing that a reclamation group (a reclamation target candidate page list) has been selected, through a hardware isolate page complete message HW_ISOLATE_PAGE_DONE at operation 1960. The transferred information may include the first page frame number of the reclamation target candidate page list and bitmap information about the list.

Figure 19B:
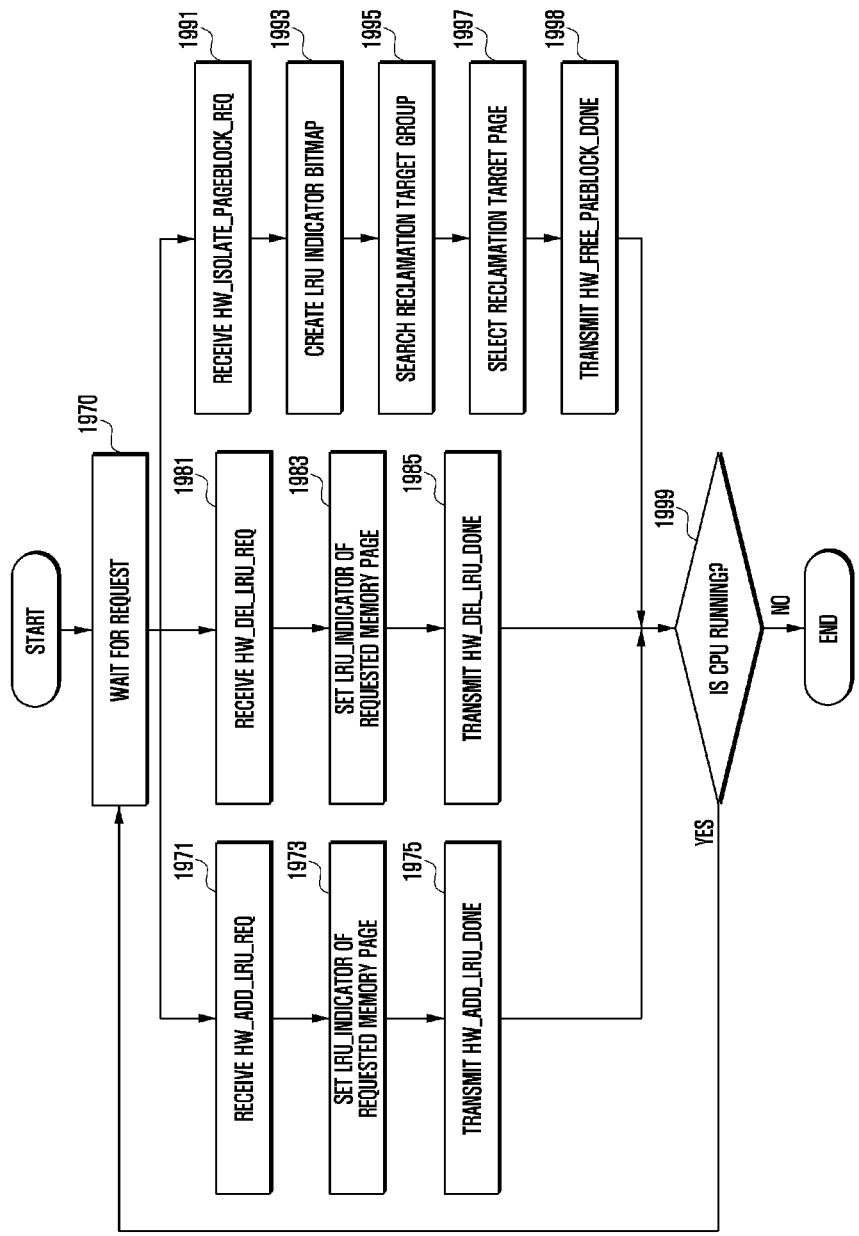
FIG. 19B is a flow chart that describes a process of reclaiming memory based on a received message according to an embodiment of the present disclosure.

FIG. 19B is a flow chart that describes a process of reclaiming memory based on a received message according to an embodiment of the present disclosure.

Operations 1970, 1971, 1973, 1975 and 1999 of FIG. 19B may correspond to the operation according to the interface described above referring to FIG. 13. Operations 1970, 1981, 1983, 1985, and 1999 of FIG. 19B may correspond to the operation according to the interface described above referring to FIG. 14. Operations 1970, 1991, 1993, 1995, 1997, 1998 and 1999 of FIGS. 10C and 10D may correspond to the operation according to the interface described above referring to FIG. 15 and the operations described above referring to FIG. 16 to FIG. 19A.

Referring to FIGS. 20 to 27, the MCM is described as follows. When the software OS is short of memory, the compaction is performed to secure the memory space. The compaction is accelerated by the MCM. Referring to FIGS. 20 to 23, interface between the software OS and the MCM is described as follows.

Figure 20:
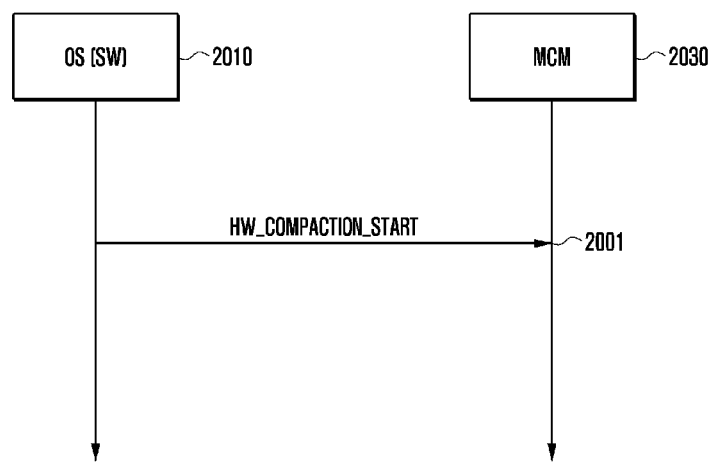
FIG. 20 is a diagram that describes a compaction start process according to an embodiment of the present disclosure.

FIG. 20 is a diagram that describes a compaction start process according to an embodiment of the present disclosure.

Referring to FIG. 20, when the software OS 2010 starts performing a memory compaction, it informs the MCM 2030 of the compaction start through a hardware compaction start message HW_COMPACTION_START at operation 2001. The transferred information is a zone identifier, zone_id, indicating a type of zone and a compaction identifier, compaction_id, identifying compaction. The MCM 2030 received the information from the software OS 2010 and generates bitmaps as the number of page blocks of zones requested. The initial value is set to '0.' Each bit indicates whether a corresponding page block is migrated in a corresponding compaction identifier, compaction_ID, or allocated to a free page block.

Figure 21:
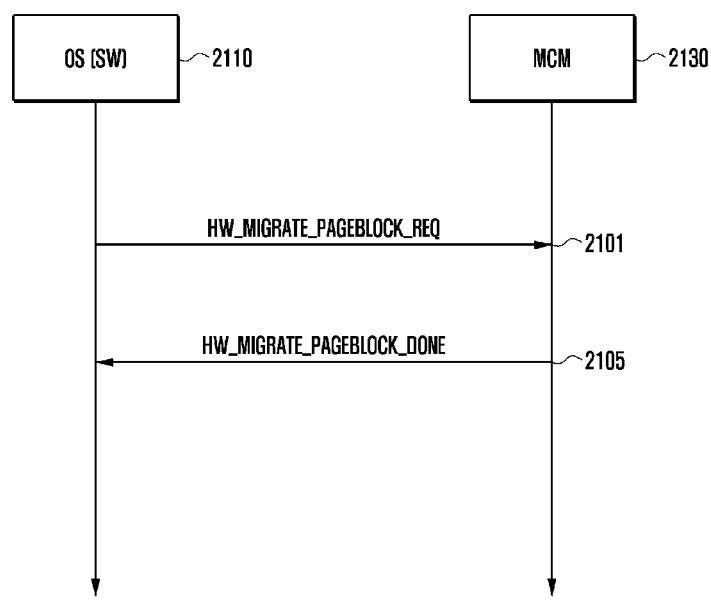
FIG. 21 is a diagram that describes an interface for requesting a mobile page block according to an embodiment of the present disclosure.

FIG. 21 is a diagram that describes an interface for requesting a mobile page block according to an embodiment of the present disclosure.

Referring to FIG. 21, the software OS 2110 requests to allocate a corresponding page block from the MCM 2130 of the memory manager accelerator, through a hardware page block migration request message HW_MIGRATE_PAGE-BLOCK_REQ, in order to select a memory page that is in use and will be migrated, during the memory compaction at operation 2101. The transferred information is a zone identifier, zone_id, indicating a type of zone and a compaction identifier, compaction_id, indicating a type of compaction. The MCM 2130 receives the information and informs the software OS 2110 of the first page frame number of a page block selected from the requested zone, by a fast compaction algorithm, and a compaction identifier, compaction_id, through a hardware page block migration complete message HW_MIGRATE_PAGEBLOCK_DONE at operation 2105. The MCM 2130 sets the bit mapped to a corresponding page block in a bitmap of the requested compaction identifier, compaction_ID, for the selected page block, to '1'.

Figure 22:
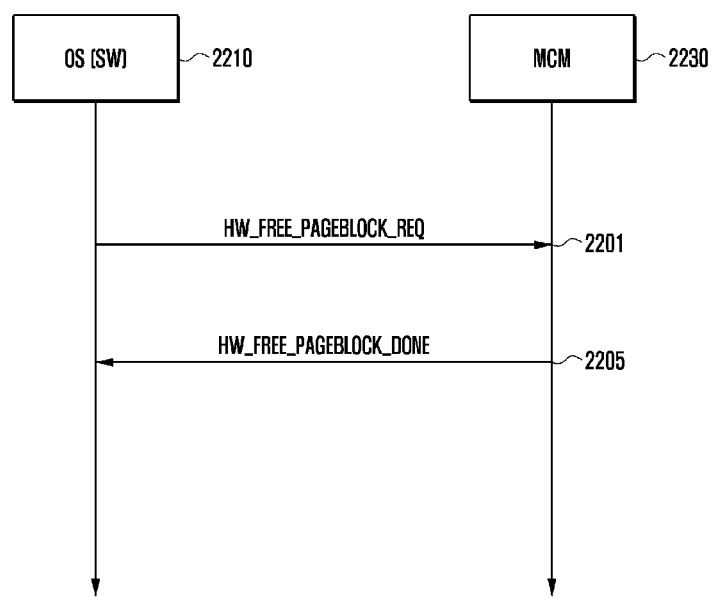
FIG. 22 is a diagram that describes an interface for requesting a free page block according to an embodiment of the present disclosure.

FIG. 22 is a diagram that describes an interface for requesting a free page block according to an embodiment of the present disclosure.

Referring to FIG. 22, the software OS 2210 requests to allocate a corresponding page block from the MCM 2230 of the memory manager accelerator, through a hardware free page block request message HW_FREE_PAGEBLOCK_REQ, in order to select a free page that pages, which have been selected from the selected block and are in use, will be migrated to, during the memory compaction at operation 2201. The transferred information is a zone identifier, zone_id, indicating a type of zone and a compaction identifier, compaction_id, indicating a type of compaction. The MCM 2230 receives the information and informs the software OS 2210 of the first page frame number of a page block selected from the requested zone, by a fast compaction algorithm, and a compaction identifier, compaction_id, through a hardware free page block complete message HW_FREE_PAGEBLOCK_DONE at operation 2205. The MCM 2230 sets the bit mapped to a corresponding page block in a bitmap of the requested compaction identifier, compaction_ID, for the selected page block, to '1.'

Figure 23:
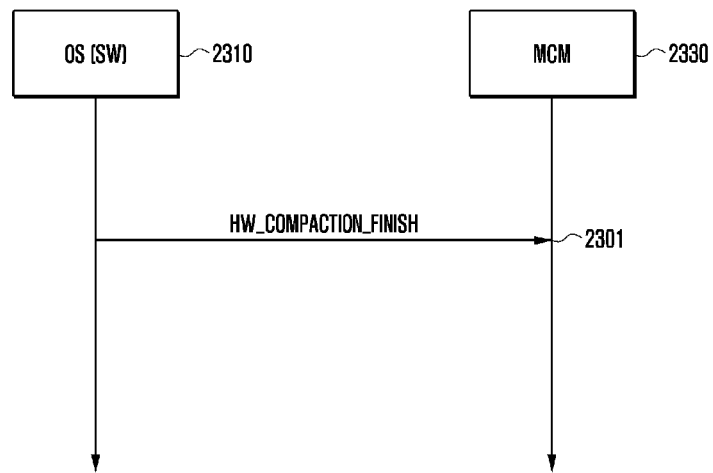
FIG. 23 is a diagram that describes a compaction complete interface according to an embodiment of the present disclosure.

FIG. 23 is a diagram that describes a compaction complete interface according to an embodiment of the present disclosure.

Referring to FIG. 23, when the software OS 2310 has completed the memory compaction, it transfers a hardware compaction complete message HW_COMPACTION_FINISH to the MCM 2330 at operation 2301. The transferred information is a compaction identifier, compaction_id. The bitmap sequence of a corresponding compaction identifier, compaction_id, is reset to '0.'

Referring to FIGS. 24 to 27, the fast compaction method of the MCM according to an embodiment of the present disclosure is described in detail as follows. The fast compaction method is to select; a page block to select pages that are in used and will be migrated; or a free page block that pages, which are in use and have been selected for migration, will be migrated to.

Figure 24:
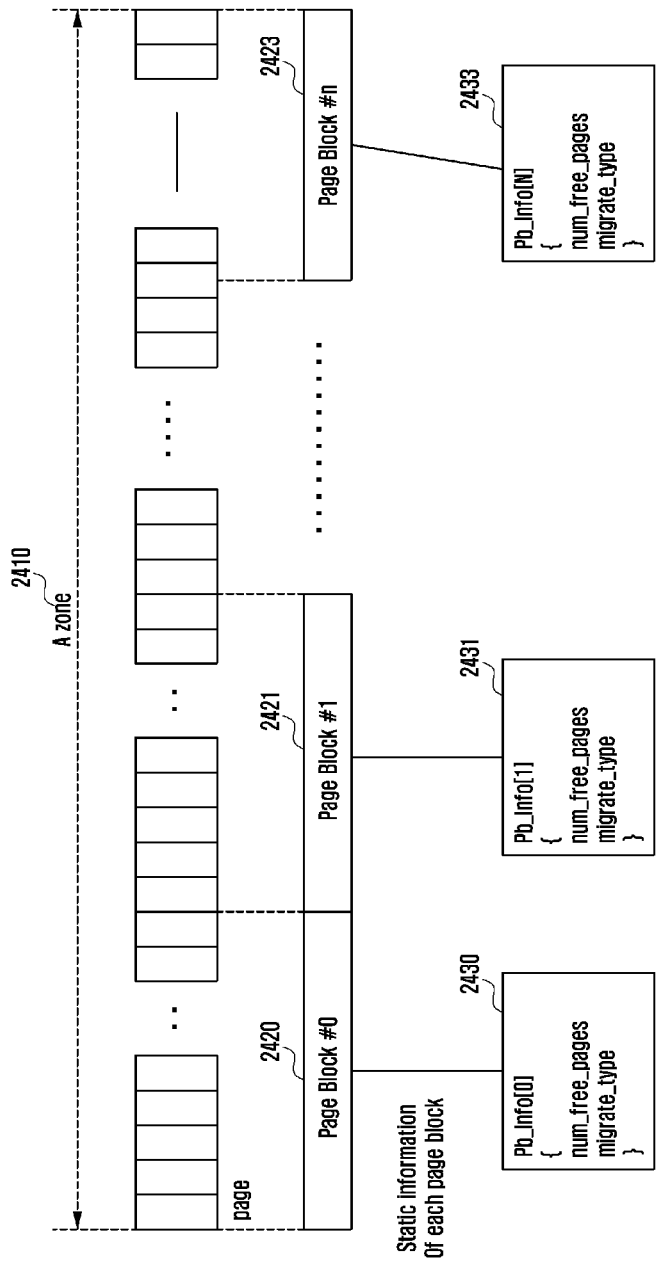
FIG. 24 is a diagram that describes management of page block information by page blocks, according to an embodiment of the present disclosure.

FIG. 24 is a diagram that describes management of page block information by page blocks, according to an embodiment of the present disclosure.

Referring to FIG. 24, one zone numbered by reference number 2410 is divided into N page blocks numbered by reference numbers 2420, 2421, . . . , and 2423 (N is positive integers). One page block includes 1024 consecutive pages. The respective page blocks are managed by data structure of page block information pb_info, 2430, 2431, . . . , and 2433. The page block information pb_info includes member variables indicating information about migration type, migrate_type, and the number of free pages, num_free_page, in a corresponding page block.

The number of free pages increases or decreases each time that pages are allocated or released in the page block. Page blocks are aligned according to the number of free pages, num_free_page. In addition, page block information is managed by using bitmap information indicating page blocks of a zone by compaction identifiers, Compaction_id, and each bit is mapped to one page block. '1' indicates that allocation has been made in migration or free block and '0' indicates that allocation has not been made.

Figure 25:
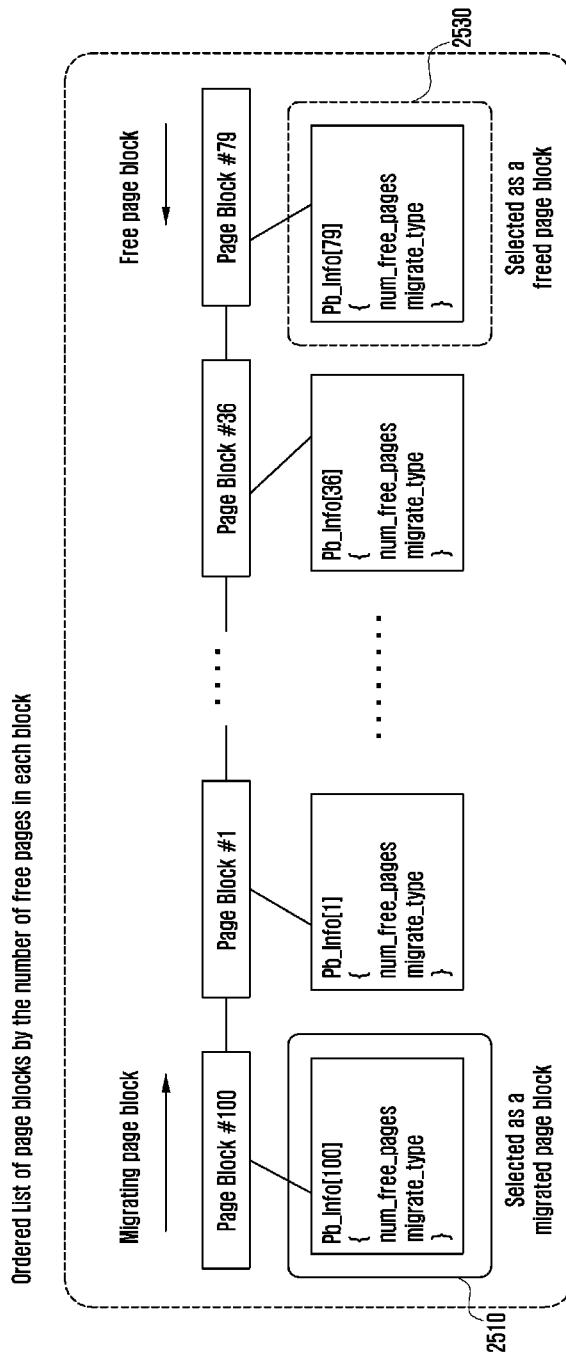
FIG. 25 is a diagram that describes arrangement of page blocks based on the number of free pages in a page block according to an embodiment of the present disclosure.

FIG. 25 is a diagram that describes arrangement of page blocks based on the number of free pages in a page block according to an embodiment of the present disclosure.

Referring to FIG. 25, the respective page blocks are aligned according to the number of free pages in the block. Since Page block #100 has the smallest number of free pages according to the number of free pages in the block, it may be selected as a migration target page block 2510. In addition, since Page block #79 has the largest number of free pages, it may be selected as a free page block 2530. As described above, the MCM may align page blocks according to the number of free pages in the page blocks. The MCM may allocate the page blocks as migration target page blocks, in order, starting from the page block that has the smallest number of free pages or the largest number of free pages.

Figure 26:
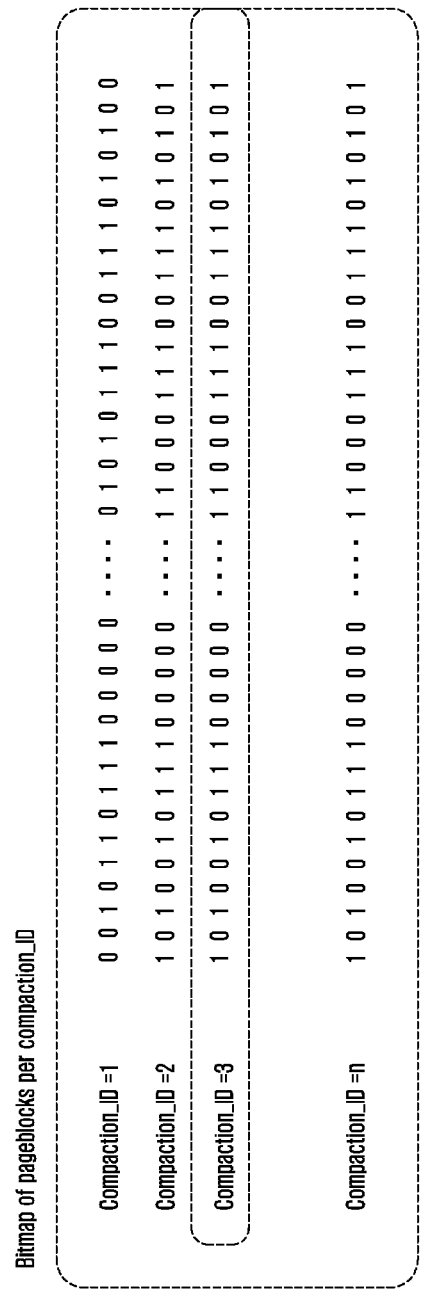
FIG. 26 is a diagram that describes bitmap information about page blocks by compaction identifiers according to an embodiment of the present disclosure.

FIG. 26 is a diagram that describes selected_indicator bitmap information about page blocks by compaction identifiers according to an embodiment of the present disclosure. When the MCM receives a hardware migration page block request message HW_MIGRATE_PAGEBLOCK_REQ, it selects one from the page blocks aligned by compaction identifiers compaction IDs on the list, which has the largest number of free pages, as a migration page block and checks whether the selected page block is a page block that has been allocated as a migration page block before a corresponding page block. When the selected page block has not been allocated a migration page block, the MCM allocates the selected page block to a migration page block. On the contrary, when the selected page block is a page block that has been allocated as a migration page block, the MCM selects the next highest ranked page block and applies allocation to the page block. The MCM transfers the first page frame number of the selected block to the software OS through a hardware migration page block complete message HW_MIGRATE_PAGEBLOCK_DONE. The selected block may indicate that it has been selected by setting the bit of the bitmap mapped to the selected page block to '1.' Therefore, as shown in FIG. 26, bits of the bit sequence are set to '1' when a page block has been selected as a migration page block and '0' when a page block has not been selected as a migration page block.

When the MCM receives a hardware free page block request message HW_FREE_PAGEBLOCK_REQ, it selects one from the aligned page blocks on the list, which has the smallest number of free pages, as a free page block and checks whether the selected page block has been allocated as a free page block before a corresponding page block. When the selected page block is a page block that has not been allocated as free page block, the MCM allocates as the selected page block to a free page block. On the contrary, when the selected page block is a page block that has been allocated as a free page block, the MCM selects the next highest ranked free page block and applies allocation to the selected page block. The MCM transfers the first page frame number of the selected block to the software OS through a hardware free page block complete message HW_FREE_PAGEBLOCK_DONE. The selected block may indicate that it has been selected by setting the bit of the bitmap mapped to the selected page block to '1.' Therefore, as shown in FIG. 26, bits of the bit sequence are set to '1' when a page block has been selected as a free page block and '0' when a page block has not been selected as a free page block.

Figure 27A:
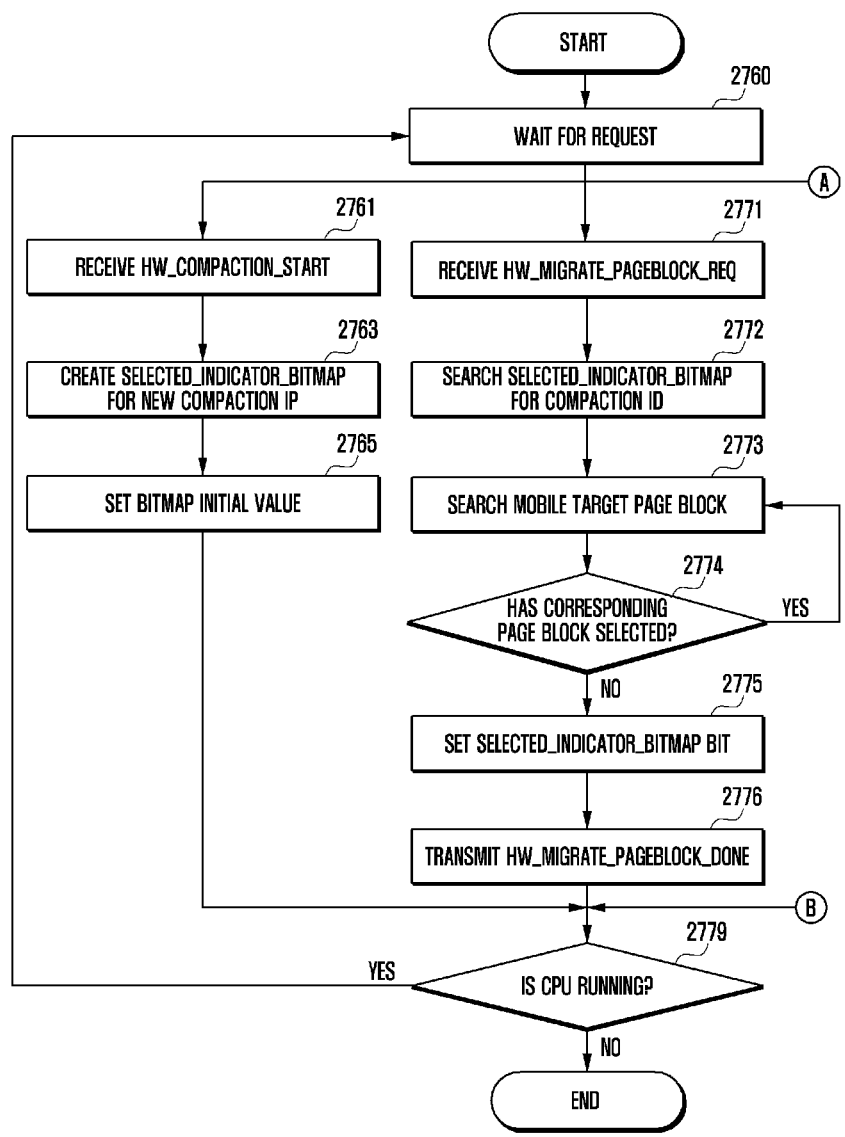
FIGS. 27A and 27B are flow chart that describes a compaction method according to an embodiment of the present disclosure.
Figure 27B:
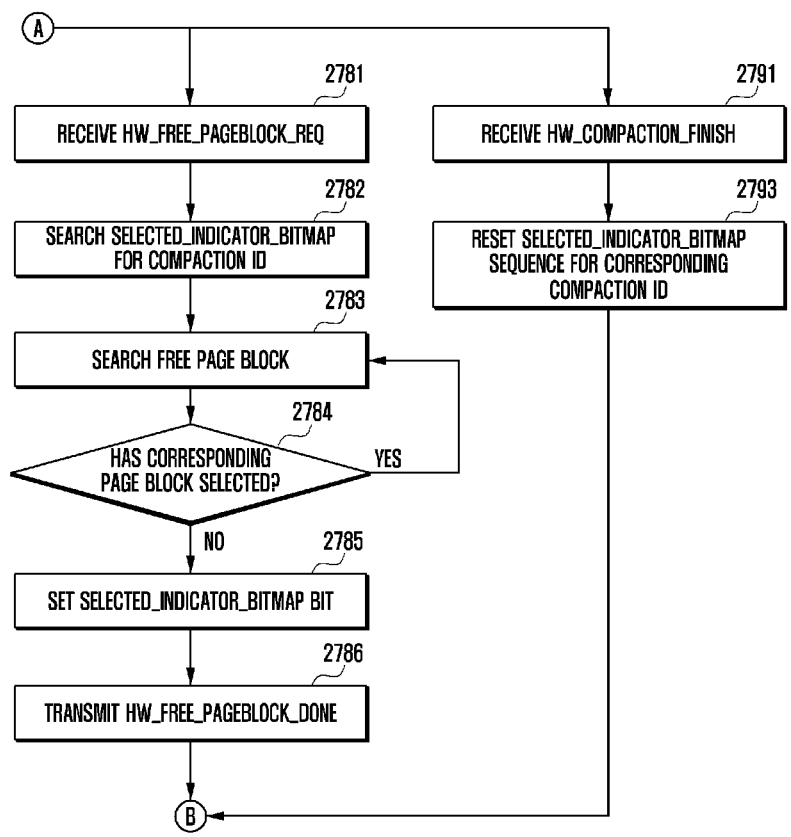

FIGS. 27A and 27B are flow chart that describes a compaction method according to an embodiment of the present disclosure.

Referring to FIGS. 27A to 27B, the MCM may wait for a request at operation 2760. The MCM may receive a hardware compaction start message HW_COMPACTION_START from the software OS at operation 2761. The MCM may generate bitmap information based on the compaction identifier and the zone information, transferred through the hardware compaction start message at operation 2763. The MCM may generate bitmap information with as many bits as page blocks included in the zone. The MCM may initialize the respective bit values in the bitmap at operation 2765. For example, the MCM may set the respective bit values to '0' as an initial value.

The MCM may receive a hardware page block migration request message HW_MIGRATION_PAGEBLOCK_REQ from the software OS, in order to select a memory page that is in use and will be migrated at operation 2771. The migration request message includes a zone identifier, zone_id, indicating a type of zone and a compaction identifier, compaction_id, indicating a type of compaction. The MCM may search for a bitmap of a page block corresponding to the compaction identifier included in the migration request message at operation 2772.

The MCM may search for a migration target page block at operation 2773. The MCM may search for one of the page blocks corresponding to the compaction identifier that has the smallest number of free pages. In addition, as shown in FIG. 25, the MCM may also align page blocks according to the number of free pages.

The MCM may determine whether a page block including the smallest number of free pages has been selected as a migration page block or a free page block at operation 2774. When the searched page block has been selected as a migration page block or a free page block at operation 2774, the MCM returns to operation 2773 and selects the next migration page block. When the searched page block has not been selected as a migration page block or a free page block at operation 2774, the MCM proceeds with operation 2775. The determination as to whether a page block has not been allocated as a migration page block or a free page block may be made, based on bit information indicating a migration type of page block.

The MCM alters the bit setting in the selected page block at operation 2775. When the bit of a page block that has not been allocated has been set to '0,' the MCM may set the bit information indicating a migration type of page block to '1.' The MCM may inform the selected migration page block information, by using a hardware page block migration complete message HW_MIGRATE_PAGEBLOCK_DONE at operation 2776. The migration page block information may include a compaction identifier and the first page frame number of the selected migration page block.

The MCM may receive a hardware free page block request message HW_FREE_PAGEBLOCK_REQ from the software OS at operation 2781. The hardware free page block request message includes a zone identifier, zone_id, indicating a type of zone and a compaction identifier, compaction_id, indicating a type of compaction. The MCM may search for selected_indicator bitmap of a page block corresponding to the compaction identifier included in the free page block request message at operation 2782.

The MCM may search for a page block corresponding to the compaction identifier at operation 2783. The MCM may search for one of the page blocks corresponding to the compaction identifier that has the largest number of free pages. In addition, as shown in FIG. 25, the MCM may also align page blocks according to the number of free pages.

The MCM may determine whether a page block including the largest number of free pages has been selected as a migration page block or a free page block at operation 2784. When the searched page block has been selected as a migration page block or a free page block at operation 2784, the MCM returns to operation 2783 and selects the next free page block. When the searched page block has not been selected as a migration page block or a free page block at operation 2784, the MCM proceeds with operation 2785. The determination as to whether a page block has not been allocated as a migration page block or a free page block may be made, based on bit information indicating a migration type of page block.

The MCM alters the bit setting in the selected page block at operation 2785. When the bit of a page block that has not been allocated has been set to '0,' the MCM may set the bit information indicating a migration type of page block to '1.' The MCM may inform the selected free page block information, by using a hardware free page block complete message HW_FREE_PAGEBLOCK_DONE at operation 2786. The free page block information may include a compaction identifier and the first page frame number of the selected migration page block.

When the compaction has been completed, the MCM receives the hardware compaction complete message HW_COMPACTION_FINISH from the software OS at operation 2791. The memory compaction complete message includes information about a compaction identifier, compaction_id. The MCM resets the bitmap sequence of a corresponding compaction identifier, compaction_id, to '0' at operation 2793.

After operations 2765, 2776, 2786, or 1793, the MCM determines if a central processing unit (CPU) is running at operation 2779. If the CPU is not running the MCM ends the process. If the CPU is running the MCM returns to operation 2760.

According to an embodiment of the present disclosure, a method and apparatus may be provided that efficiently manages memory in an electronic device. In addition, according to an embodiment of the present disclosure, a hardware-based memory management apparatus and memory management method may be provided.

The memory manager hardware accelerator resolves fragmentation of memory by accelerating a memory allocation and release function, a memory reclamation function, and a memory compaction function, so that, although the frequency of occurrence of the memory reclamation and memory compaction decreases and the memory reclamation and memory compaction occurs, the execution rate increases.

In addition, according to an embodiment of the present disclosure, allocation can be made to memory that is consecutively adjacent to a boundary generated by allocating memory by a unit of $2^{nd}$ generated when allocating memory or releasing memory allocation, thereby lowering the frequency of occurrence of the memory reclamation and compaction, compared to a memory allocation method of an OS.

In addition, according to an embodiment of the present disclosure, since the acceleration of a memory reclamation function is performed so that consecutive pages are first reclaimed from reclaimed pages by checking the continuity of the reclaimed pages, the frequency of occurrence of the memory reclamation operations. Therefore, as the frequency of occurrence of the memory reclamation operations that occur because of fragmentation decreases, the memory allocation rate is improved.

In addition, according to an embodiment of the present disclosure, since the memory compaction accelerator selects target pages for compaction, considering the continuity of pages, the number of compacted pages is small compared to the related-art technology, and thus the period of time for performing the compaction is decreased.

While the present disclosure has been shown and described with reference to various embodiments thereof, it will be understood by those skilled in the art that various changes in form and details may be made therein without departing from the spirit and scope of the present disclosure as defined in the appended claims and their equivalents.

What is claimed is:

1. A method for allocating memory by a hardware memory management device, the method comprising:
   receiving, by a controller of the hardware memory management device, initialization information including zone identifier, zone start page information, zone end page information from a memory manager of an operating system (OS);
   generating, by the controller, zone information and page information based on the zone identifier, the zone start page information and the zone end page information, wherein the page information includes an allocation indicator, and a migration type indicator of each page associated with the zone information;

receiving, by the controller, a memory allocation request message including allocation request memory size information, zone indicating information and migration type information from the memory manager of the OS;

extracting, by the controller, allocation indicator bit sequence information related to a page of a zone indicated by the zone indicating information based on the allocation indicator of each page included in the page information;

searching consecutive free pages for allocating the memory by moving a search window from a first bit of the allocation indicator bit sequence information by a size of the search window, the size of the search window corresponding to the allocation request memory size information;

searching the consecutive free pages for allocating the memory by moving the search window from a second bit of the allocation indicator bit sequence information by the size of the search window, if the consecutive free pages are not searched by the searching from the first bit; and allocating, by the controller, the memory corresponding to the memory allocation request message based on the searched consecutive free pages and the migration type information.

2. The method of claim 1, wherein the searching of the consecutive free pages further comprises:
stopping the searching of the consecutive free pages, if a size of the searched consecutive free pages is more than a size of the memory requested for allocation.

3. The method of claim 1, the method further comprising:
transmitting a page allocation complete message including a first page frame number of an allocated page to the OS.

4. A hardware memory management device for allocating memory, the hardware memory management device comprising:
a program memory storing one or more computer programs; and
a controller coupled with the program memory,
wherein the one or more computer programs, when executed by the controller, include instructions for:
receiving, by the controller of the hardware memory management device, initialization information including zone identifier, zone start page information, zone end page information from a memory manager of an operating system (OS), generating zone information and page information based on the zone identifier, the zone start page information and the zone end page information, wherein the page information includes an allocation indicator, and a migration type indicator of each page associated with the zone information, receiving a memory allocation request message including allocation request memory size information, zone indicating information and migration type information from the memory manager of the OS, extracting allocation indicator bit sequence information related to a page of a zone indicated by the zone indicating information based on the allocation indicator of each page included in the page information, searching consecutive free pages for allocating the memory by moving a search window from a first bit of the allocation indicator bit sequence information by a size of the search window, the size of the search window corresponding to the allocation request memory size information, searching the consecutive free pages for allocating the memory by moving the search window from a second bit of the allocation indicator bit sequence information by the size of the search window, if the consecutive free pages are not searched by the searching from the first bit, and allocating the memory corresponding to the memory allocation request message based on the searched consecutive free pages and the migration type information.

5. The hardware memory management device of claim 4, wherein the one or more computer programs further include instructions for stopping the searching of the consecutive free pages, if a size of the searched consecutive free pages is more than a size of the memory requested for allocation.

6. The hardware memory management device of claim 4, wherein the one or more computer programs further include instructions for controlling a modem to transmit a page allocation complete message including a first page frame number of an allocated page to the OS.

* * * * *